US008713288B2

(12) United States Patent
Yoshihara et al.

(10) Patent No.: US 8,713,288 B2
(45) Date of Patent: Apr. 29, 2014

(54) STORAGE SYSTEM COMPRISING MULTIPLE MICROPROCESSORS AND METHOD FOR SHARING PROCESSING IN THIS STORAGE SYSTEM

(75) Inventors: Tomohiro Yoshihara, Yokohama (JP); Shintaro Kudo, Yokohama (JP); Norio Shimozono, Machida (JP)

(73) Assignee: Hitachi, Ltd., Tokyo (JP)

( * ) Notice: Subject to any disclaimer, the term of this patent is extended or adjusted under 35 U.S.C. 154(b) by 902 days.

(21) Appl. No.: 12/919,106

(22) PCT Filed: Jun. 17, 2010

(86) PCT No.: PCT/JP2010/004043
§ 371 (c)(1),
(2), (4) Date: Aug. 24, 2010

(87) PCT Pub. No.: WO2011/158296
PCT Pub. Date: Dec. 22, 2011

(65) Prior Publication Data
US 2012/0278589 A1 Nov. 1, 2012

(51) Int. Cl.
G06F 13/38 (2006.01)
G06F 3/06 (2006.01)

(52) U.S. Cl.
USPC .......................................................... 712/30

(58) Field of Classification Search
None
See application file for complete search history.

(56) References Cited

U.S. PATENT DOCUMENTS

| 5,218,686 | A  | * | 6/1993  | Thayer ........................... 711/100 |
| 5,721,860 | A  | * | 2/1998  | Stolt et al. ..................... 711/105 |
| 7,159,071 | B2 |   | 1/2007  | Ikeuchi |
| 7,617,360 | B2 |   | 11/2009 | Arai |
| 8,271,979 | B2 |   | 9/2012  | Sugimoto |
| 2005/0021907 | A1 |   | 1/2005 | Shimada |
| 2009/0150608 | A1 | * | 6/2009 | Innan et al. .................... 711/113 |
| 2009/0313503 | A1 | * | 12/2009 | Atluri et al. ..................... 714/19 |

FOREIGN PATENT DOCUMENTS

| EP | 1708077 A1 | 10/2006 |
| EP | 1727033 A1 | 11/2006 |
| EP | 1835389 A2 | 9/2007 |
| JP | 2004 295860 | 10/2004 |
| JP | 2005-44010 | 2/2005 |
| JP | 2006 277487 | 10/2006 |
| JP | 2007 249729 | 9/2007 |

* cited by examiner

*Primary Examiner* — Eric Coleman
(74) *Attorney, Agent, or Firm* — Brundidge & Stanger, P.C.

(57) ABSTRACT

The present invention provides a storage system in which each microprocessor is able to execute synchronous processing and asynchronous processing in accordance with the operating status of the storage system. Any one attribute, from among multiple attributes (operating modes) prepared beforehand, is set in each microprocessor in accordance with the operating status of the storage system. The attribute that is set in each microprocessor is regularly reviewed and changed.

11 Claims, 42 Drawing Sheets

FIG. 6

EXECUTION COUNT LIMIT TUNING TABLE — 230

| SETTING TYPE | HOST I/F PROCESSING EXECUTION COUNT | DISK I/F PROCESSING EXECUTION COUNT |
|---|---|---|
| HOST I/F PRIORITY | ULNeh1 | ULNed1 |
| COEQUAL | ULNeh2 | ULNed2 |
| DISK I/F PRIORITY | ULNeh3 | ULNed3 |

EXECUTION COUNT TABLE — 240

| PROCESSING TYPE (241) | EXECUTION COUNT (242) | EXECUTION COUNT LIMIT (243) |
|---|---|---|
| HOST I/F PROCESSING | Neh | ULNeh |
| DISK I/F PROCESSING | Ned | ULNed |

FIG. 8

| CYCLIC PROCESSING TABLE | | | 250 |
| --- | --- | --- |
| PROCESSING TYPE (251) | NEXT EXECUTION TIME (252) | CYCLE (253) |
| REVIEW EXECUTION COUNT LIMIT | T1 | Cyc1 |
| CREATE HOST DATA HDD WRITE PROCESS | T2 | Cyc2 |

FIG. 9

| THRESHOLD TABLE FOR SETTING LIMIT ON NUMBER OF EXECUTIONS ||
| REFERENCE INFORMATION | THRESHOLD |
| MP RATE OF OPERATION | ThUmp |
| CACHE DIRTY RATIO | ThCd |

FIG. 27

MENU SCREEN

EXECUTION COUNT LIMIT SETTING

| SETTING TYPE | HOST I/F PROCESSING EXECUTION COUNT | DISK I/F PROCESSING EXECUTION COUNT |
|---|---|---|
| HOST I/F PRIORITY | Neh1 | Ned1 |
| COEQUAL | Neh2 | Ned2 |
| DISK I/F PRIORITY | Neh3 | Ned3 |

THRESHOLD FOR SETTING LIMIT ON NUMBER OF EXECUTIONS

| REFERENCE INFORMATION | THRESHOLD |
|---|---|
| MP RATE OF OPERATION | ThUmp |
| CACHE DIRTY RATIO | ThCd |

B10 — SAVE    B11 — CANCEL

FIG. 28

EXECUTION COUNT LIMIT TUNING TABLE — 230A

| SETTING TYPE (231A) | SYNCHRONOUS PROCESSING EXECUTION COUNT (232A) | ASYNCHRONOUS PROCESSING EXECUTION COUNT (233A) |
|---|---|---|
| SYNCHRONOUS PROCESSING PRIORITY | ULNes1 | ULNeas1 |
| COEQUAL | ULNes2 | ULNeas2 |
| ASYNCHRONOUS PROCESSING PRIORITY | ULNes3 | ULNeas3 |

EXECUTION COUNT TABLE — 240A

| PROCESSING TYPE (241A) | EXECUTION COUNT (242A) | EXECUTION COUNT LIMIT (243A) |
|---|---|---|
| SYNCHRONOUS PROCESSING | Nes | ULNea |
| ASYNCHRONOUS PROCESSING | Neas | ULNeas |

FIG. 30

| MP# | ATTRIBUTE FLAG |
|---|---|
| 0 | HOST I/F PRIORITY |
| 1 | BOTH I/F COEQUAL |
| 2 | DISK I/F |
| 3 | HOST I/F SPECIALIZED |
| 4 | DISK I/F SPECIALIZED |
| ... | ... |

MP SETTING INFORMATION TABLE — 290
291 / 292

STORAGE SYSTEM COMPRISING MULTIPLE MICROPROCESSORS AND METHOD FOR SHARING PROCESSING IN THIS STORAGE SYSTEM

TECHNICAL FIELD

The present invention relates to a storage system comprising multiple microprocessors and a method for sharing the processing in this storage system.

BACKGROUND ART

A storage system ordinarily includes multiple storage devices and a controller, which receives an I/O (Input/Output) request from an external device (for example, a host computer). The configuration of the controller, for example, is disclosed in Patent Literature 1.

CITATION LIST

Patent Literature

[PTL 1]
Japanese Patent Application Laid-Open No. 2005-044010

SUMMARY OF INVENTION

Technical Problem

In a case where the I/O request received from the external device is a read request, the controller, for example, executes processing (a storage device read process) that transfers data from the storage device to a cache memory (CM), and processing (a CM read process) that reads the data from the CM and transfers this data to the external device, or only the CM read process.

In a case where the I/O request received from the external device is a write request, the controller, for example, executes processing (a CM write process) that transfers data received from the external device to the CM, and processing (a storage device write process) that transfers the data from the CM to the storage device.

Multiple microprocessors of the controller are able to execute synchronous processing and asynchronous processing. "Synchronous processing" must be executed between the time when an I/O request is received from the external device and the time when a response to this I/O request is returned to the external device. Synchronous processing, for example, includes the execution of the above-mentioned storage device read process, the CM read process, and the CM write process. Alternatively, "asynchronous processing" signifies processing other than synchronous processing, and, for example, refers to the execution of the above-mentioned storage device write process.

In a case where the microprocessors execute asynchronous processing for a long time, the execution of the synchronous processing will be delayed to that extent, and therefore the response to the external device will be delayed. By contrast, in a case where synchronous processing is given priority, the response to the external device can be speeded up. However, since the asynchronous processing will be delayed in accordance with this, data that has not been written to the storage device accumulates in large amounts in the CM, reducing the CM free space. When CM free space is reduced, it is not possible to secure enough cache area for processing an I/O request from the external device, making it necessary to wait for the CM free space to increase in accordance with a storage device write process, and thereby corrupting the synchronous processing response.

Accordingly, an object of the present invention is to provide a storage system, which comprises multiple microprocessors, and which is able to make efficient use of each microprocessor by appropriately executing both synchronous processing and asynchronous processing in each microprocessor, and a method for sharing processing in this storage system. Other objects of the present invention should become clear from the description of the embodiment, which will be explained below.

Solution to Problem

In a storage system of the present invention that solves for the problems described above, the microprocessor of the controller is able to execute synchronous processing up to a preset upper limit value, and asynchronous processing may be executed in a case where synchronous processing is not executed.

BRIEF DESCRIPTION OF DRAWINGS

FIG. 6 is a table for tuning the upper limit value of the execution count for each mode.
FIG. 7 is a table for managing the execution count for synchronous processing and asynchronous processing.
FIG. 8 is a table for managing a process that is executed cyclically.
FIG. 9 is a table for managing a threshold for resetting the upper limit value of the execution count for synchronous processing and asynchronous processing.

FIG. 27 is an example of a management screen provided by the management console.

FIG. 28 is a block diagram of a table used in a storage system related to a second embodiment.

FIG. 30 is a table for managing information to be set in the microprocessor.

DESCRIPTION OF EMBODIMENTS

The embodiments of the present invention will be explained below on the basis of the drawings. The present invention, as will be described hereinbelow, is related to a storage system that includes multiple storage devices that are able to provide multiple logical volumes, and a controller, which receives from an external device an input/output request that specifies any of the multiple logical volumes and processes this request. The controller includes at least one first interface for communicating with the external device, at least one second interface for communicating with the storage devices, a memory, which is respectively coupled to each first interface and each second interface, and multiple microprocessors, which are respectively coupled to each first interface, each second interface, and the memory. Each of the microprocessors is able to execute synchronous processing, whose execution is triggered by the input-output request from the external device, and asynchronous processing, which is processing other than synchronous processing. Each of the microprocessors is able to execute the synchronous processing up to a preset upper limit value, and is able to execute the asynchronous processing in a case where the synchronous processing is not executed.

Furthermore, the descriptions of the embodiments discussed below do not limit the scope of the present invention. Not all of the combinations of characteristic features explained in the embodiments are necessarily essential to the invention solution.

Embodiment 1

Figure 1:
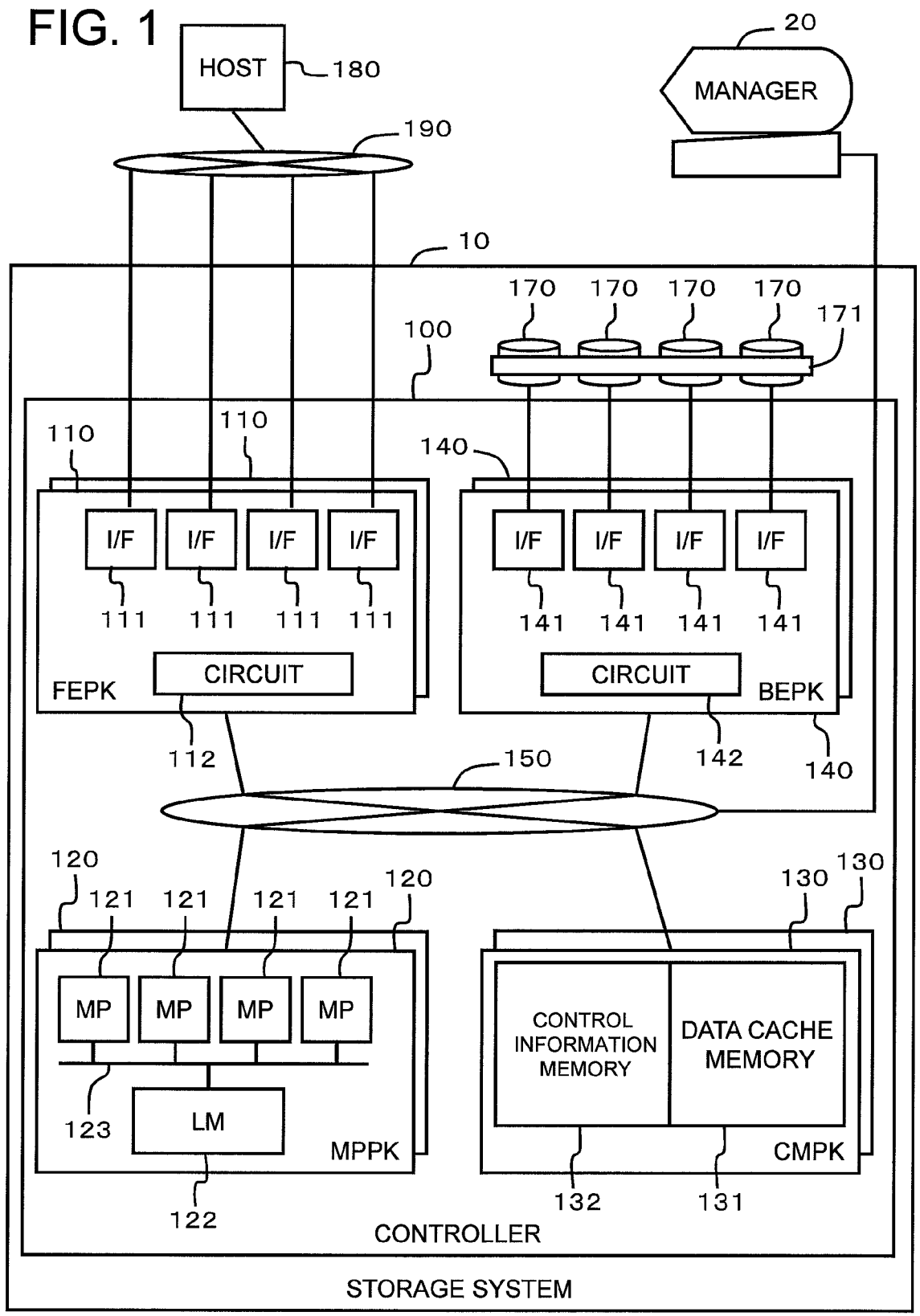
FIG. 1 is a diagram of a computer system that comprises a storage system.

FIG. 1 shows a computer system comprising a storage system related to a first embodiment of the present invention. In the explanation that follows, interface may be shortened to "I/F".

The computer system comprises one or more host computers 180, a storage system 10, and a management console 20. Communication between the host computer 180 and the storage system 10, for example, is carried out via a communication network 190.

The communication network 190, for example, may be any network that is capable of carrying out data communications, such as a SAN (Storage Area Network), a LAN (Local Area Network), the Internet, a leased line, or a public line. The protocol for communications between the host computer 180 and the storage system 10, for example, may be an arbitrary protocol of various protocols that make it possible to send and receive data, such as either the fibre channel protocol or the TCP/IP protocol.

When the host computer 180 is a so-called mainframe, for example, a communication protocol such as FICON (Fibre Connection: registered trademark), ESCON (Enterprise System Connection: registered trademark), ACONARC (Advanced Connection Architecture: registered trademark), and FIBARC (Fibre Connection Architecture: registered trademark) may be used.

The management console 20 is a computer for managing the storage system 10, and is operated by a user.

The host computer 180 sends an I/O request to the storage system 10. The I/O request, for example, is either a read request or a write request. A read request, for example, comprises a LUN (Logical Unit Number) and a LBA (Logical Block Address) that correspond to the read-source of the read-targeted data. A write request, for example, comprises a LUN and a LBA that correspond to the write-destination of write-targeted data, and the write-targeted data. The LUN is allocated to a logical volume 171 in the storage system 10. The LBA is an address of a storage area (block) inside the logical volume 171.

In the following explanation, the read-targeted data may be called read data and the write-targeted data may be called write data. In addition, the read-targeted data and the write-targeted data may be called host data.

The storage system 10 comprises multiple HDDs (Hard Disk Drives) 170 and a controller 100. The controller 100 receives an I/O request from the host computer 180, accesses any storage device 170, and returns the processing result of the I/O request to the host computer 180.

The HDD 170 is one example of a storage device. The storage device is not limited to a hard disk drive. For example, a variety of devices that are capable of reading and writing data, such as a semiconductor memory device, an optical disk device, a magneto-optical disk device, a magnetic tape device, and a flexible disk device, may be used as the storage device.

Multiple logical volumes 171 may be created based on the physical storage area of the multiple HDDs 170. Specifically, a RAID (Redundant Array of Independent (or Inexpensive) Disks) group is created in accordance with two or more HDDs 170. Either one or multiple logical volumes 171 are set using the physical storage area of respective RAID groups. One logical volume 171 is shown in FIG. 1, but under ordinary circumstances, the storage system 10 comprises a large number of RAID groups and a large number of logical volumes 171.

A LUN is allocated to the logical volume 171, and this LUN is provided to the host computer 180. The controller 100 identifies a logical volume corresponding to a LUN specified by an I/O request, accesses the HDD 170 constituting the basis of this logical volume, and reads/writes data from/to this HDD 170.

In Thin Provisioning technology, the logical volume is a pool volume, and a LUN is not allocated thereto. In this case, the LUN is allocated to a logical volume that is set virtually. The controller 100, upon receiving an I/O request for the virtual logical volume, accesses the pool volume corresponding to the access destination in the virtual logical volume, and reads/writes data from/to this pool volume.

The controller 100, for example, comprises one or more FEPKs (Front-End PacKage) 110 that serve as one or more host I/F units, one or more MPPKs (MicroProcessor PacKage) 120 that serves as one or more controllers, one or more CMPKs (Cache Memory PacKage) 130 that serve as one or more shared memory units, and one or more BEPKs (Back-End PacKage) 140 that serve as one or more disk I/F units.

Each FEPK 110, each MPPK 120, each CMPK 130 and each BEPK 140 is coupled to an internal network 150. The internal network 150, for example, may be either a LAN or other such communication network, or a crossbar switch or other such switching device. Each MP (MicroProcessor) 121 of each MPPK 120 is communicably coupled to each FEPK 110, each CMPK 130, and each BEPK 140 via the internal network 150.

The FEPK 110 is an interface device for communicating with the host computer 180, and comprises a host I/F 111 and a transfer control circuit 112. Each host I/F 111, for example, is a communication port. The transfer control circuit 112 is for controlling the transfer of either an I/O request or data that was received by the host I/F 111.

The BEPK 140 is an interface device for communicating with the HDD 170, and comprises a disk I/F 141 and a transfer control circuit 142. The disk I/F 141, for example, is a communication port. The BEPK 140 is coupled to each HDD 170, and is also coupled to the internal network 150. The BEPK 140 mediates the passing of either read-targeted data or write-targeted data between the internal network 150 side and the HDD 170. The transfer control circuit 142 controls the transfer of data.

The CMPK 130 comprises a cache memory (hereinafter shortened to "CM") 131, and a control memory 132. The CM 131 and the control memory 132 may be configured from volatile memories, such as DRAM (Dynamic Random Access Memory).

The CM 131 temporarily stores data (write-targeted data) to be written to the HDD 170. The CM 131 also temporarily stores data (read-targeted data) that has been read from the HDD 170.

The control memory 132 stores various types of control information required for processing, such as synchronous processing and asynchronous processing. For example, HDD configuration information and volume management information may be cited as types of control information. HDD configuration information manages which RAID group is configured from which HDD 170. The volume management information manages which logical volume corresponds to what kind of function.

The MPPK 120 controls the operation of the storage system 10. The MPPK 120 comprises multiple MPs 121, a local memory (LM) 122, and a bus 123 for coupling each MP 121 to the LM 122.

In this embodiment, a case in which multiple MPPKs 120 comprise multiple MPs 121 is shown, but the present invention is not limited to this, and a configuration such that multiple MPPKs 120 comprise one MP 121 each may also be used.

Either all or a portion of the control information stored in the control memory 132 is copied to the LM 122. The portion of the control information is the part required for the MPPK 120 comprising the LM 122 that stores this portion of the control information.

Figure 2:
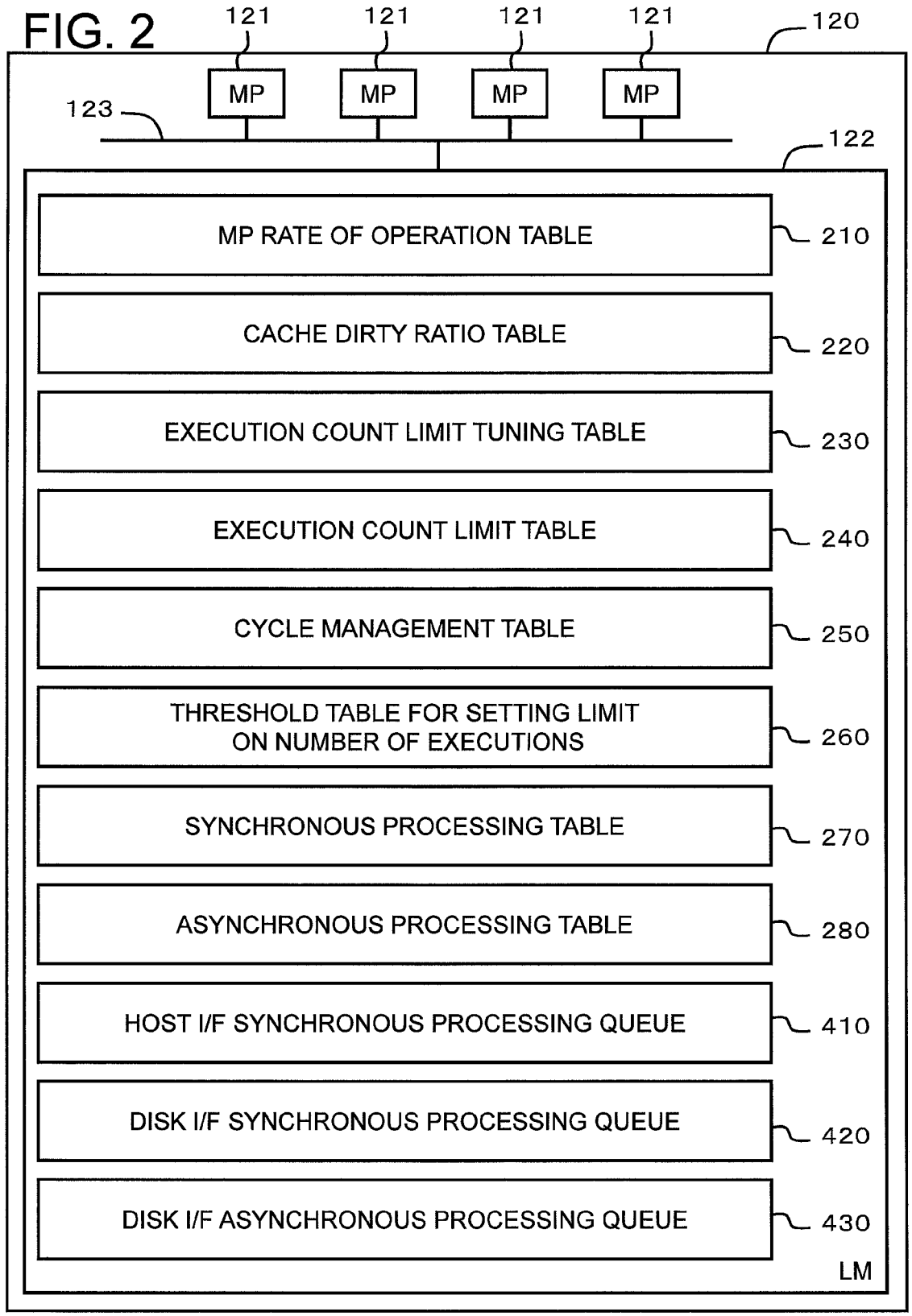
FIG. 2 is a block diagram of various types of information that are used by each microprocessor.

FIG. 2 shows various types of information (tables, queues) that are stored in the LM 122 of the MPPK 120. The LM 122, for example, stores a MP rate of operation table 210, a cache dirty ratio table 220, an execution count limit tuning table 230, an execution count limit table 240, a cycle management table 250, a threshold table for setting a limit on the number of executions 260, a synchronous process table 270, an asynchronous process table 280, a host I/F synchronous processing queue 410, a disk I/F synchronous processing queue 420, and a disk I/F asynchronous processing queue 430. An MP rate of operation table 210 either exists for each MP in the MPPK, or there is only one such table 210 in the MPPK.

Each of the tables 210 through 270 will be explained below. The host I/F synchronous processing queue 410 is for managing a synchronous processing request related to the host I/F 111. Synchronous processing may include processing (a host data CM read process) for reading host computer 180-requested read-targeted data from the CM 131 and transferring this data to the host computer 180, and processing (a host data CM write process) for storing write-targeted data received from the host computer 180 and storing this data in the CM 131.

The disk I/F synchronous processing queue 420 is for managing a synchronous processing request related to the disk I/F 141. Synchronous processing related to the disk I/F 141, for example, may include processing (a host data HDD read process) for reading read-targeted data for which a read has been requested by the host computer 180 from the storage device 170 corresponding to the read-source logical volume 171.

The disk I/F asynchronous processing queue 430 is for managing an asynchronous processing request related to the disk I/F 141. Asynchronous processing related to the disk I/F 141, for example, may include processing (a host data HDD write process) for writing write-targeted data received from the host computer 180 to the storage device 170 corresponding to the write-destination logical volume 171.

Furthermore, although omitted from the drawing, one or more computer programs executed by the respective MPs 121 may be stored in the LM 122. Each MP 121 realizes a function shown in a flowchart, which will be described hereinbelow, by reading and executing a computer program. For example, the computer programs and operating systems corresponding to the respective flowcharts of FIGS. 12 through 26 may be stored in the LM 122.

Another table and another queue besides the tables and queues shown in FIG. 2 may also be stored in the LM 122. For example, a table for managing a remote copy and a queue for managing a processing request when a failure has occurred may also be stored in the LM 122.

Figure 3:
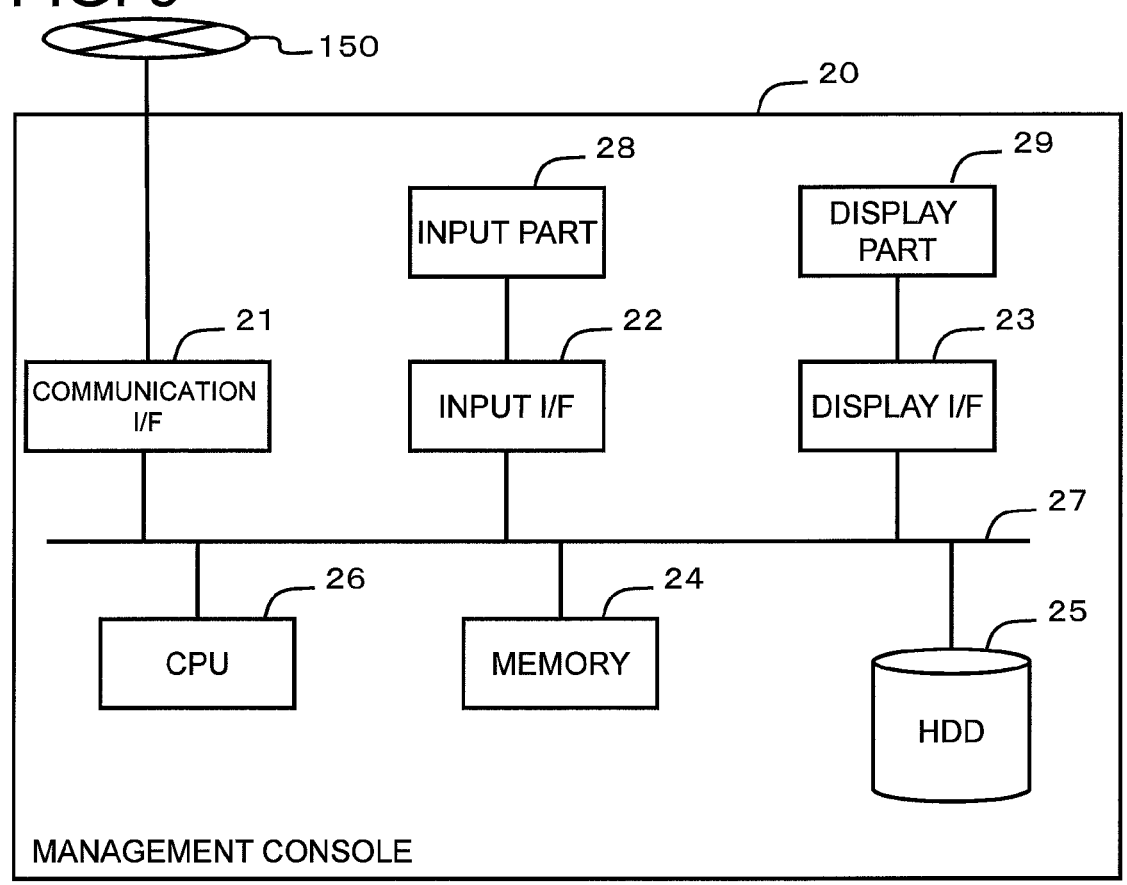
FIG. 3 is a block diagram of a management console.

FIG. 3 shows the configuration of the management console 20. The operating status of the storage system 10 can be checked via the management console 20. In addition, the setting values of the various types of tables can be changed via the management console 20. The management console 20, for example, is coupled by way of a bus 27 to a communication I/F 21, an input I/F 22, a display I/F 23, a memory 24, and HDD 25 and a CPU (Central Processing Unit) 26.

The memory 24, for example, comprises a ROM (Read Only Memory) and a RAM (Random Access Memory), and stores a boot program and programs for executing various types of processing. A work area for use by the CPU 26 may also be provided in the memory 24.

The HDD 25 stores a program and various types of information that need to be maintained even when the power to the management console 20 is OFF.

An input device 28 for receiving an operation by a management console 20 user (administrator) is coupled to the input I/F 22. The input device 28, for example, may include a pointing device like a mouse, a touch panel, a keyboard switch, and a voice input device. The input I/F 22 converts a signal from the input device 28 to data and outputs this data to the CPU 26.

A display device 29 is coupled to the display I/F 23. The display device 29, for example, may include a liquid crystal display, a plasma display, a CRT (Cathode Ray Tube), a printer, and a voice output device. The display I/F 23, for example, comprises a VRAM (Video Random Access Memory). The CPU 26 creates image data in accordance with an image to be displayed, and outputs this image data to the display device 29 for display as a screen.

The communication I/F 21 is coupled to the internal network 150 of the storage system 10, mediates in the exchange of data between the CPU 26 and the respective devices (for example, the respective MPs 121 of the respective MPPKs 120) of the storage system 10 coupled to the internal network 150.

The CPU 26 controls the operations of the respective devices 21 through 25. The CPU 26 also reads a program stored in the memory 24 and/or the HDD 25 to the RAM of the memory 24 and executes this program.

Figure 4:
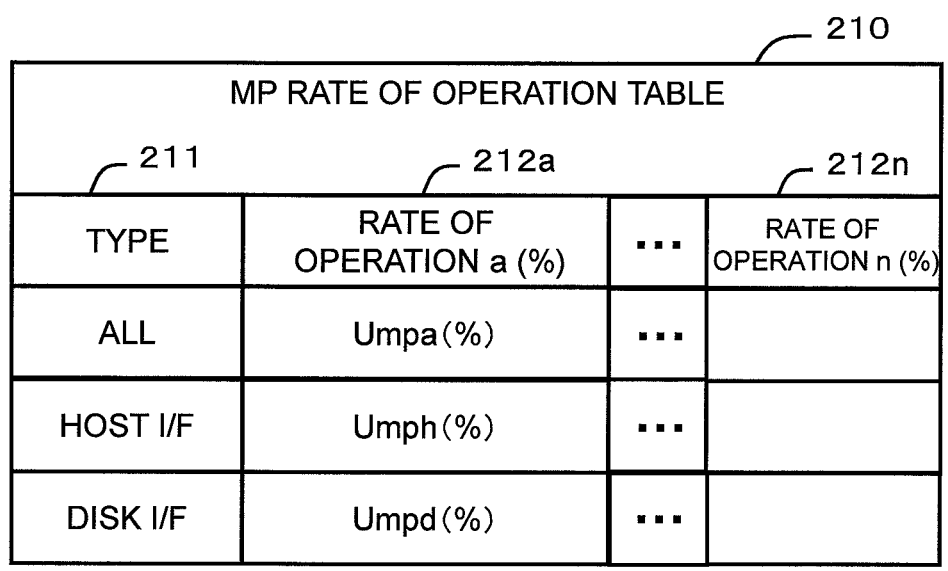
FIG. 4 is a table for managing the microprocessor rate of operation.

FIG. 4 shows a table 210 for managing the rates of operation of the respective MPs 121. The MP rate of operation table 210 comprises a type field 211, and a rate of operation field 212. A value showing the type of rate of operation is set in the type field 211. As rate of operation types there are "All", which shows the average value Umpa of the rates of operation of all the MPs, "host I/F", which shows the average value Umph of the rates of operation of MPs that are in charge of processing related to the host I/F 111, and "disk I/F", which shows the average value Umpd of the rates of operation of the MPs in charge of processing related to the disk I/F 141. The rate of operation field 212 stores each type of rate of operation for each MP of the relevant MPPK 120. The rate of operation field 212 may store the average value of the rates of operation of the respective MPs of the relevant MPPK 120 rather than the rate of operation for each MP.

Figure 5:
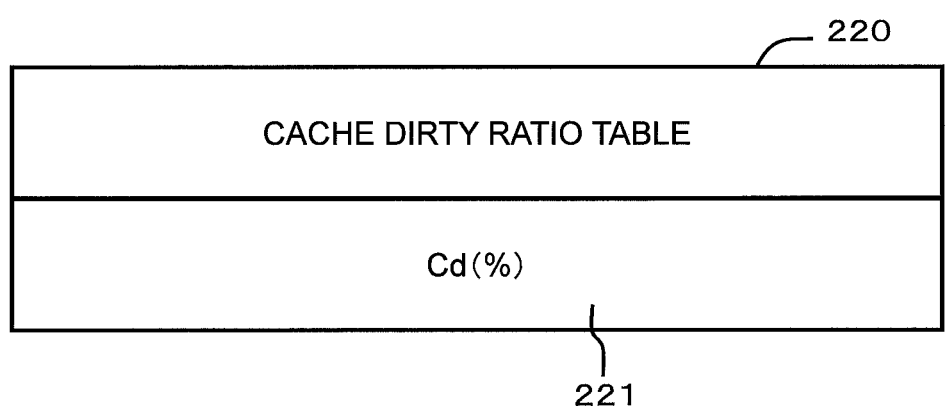
FIG. 5 is a table for managing a cache dirty ratio.

FIG. 5 shows a table 220 for managing the cache dirty ratio. The cache dirty ratio table 220 comprises a field 221 for storing a cache dirty ratio Cd.

The cache dirty ratio is the ratio of dirty data stored in the CM 131, and the larger the cache dirty ratio the more dirty data is accumulated. Dirty data is data that is stored only in the CM 131 and has not been written to the HDD 170. When dirty data is written to the HDD 170, this data changes from dirty data to clean data. Clean data is written to both the CM 121 and the HDD 170. Therefore, it is possible to release an area of the CM 121 in which clean data is stored, restore this area to the unused state, and store new data in this unused area.

FIG. 6 shows a table 230 for tuning the limit of an execution count. The execution count limit tuning table 230, for example, comprises a setting type field 231, a host I/F processing execution count field 232, and a disk I/F processing execution count field 233.

The setting type field 231 stores the setting type of the execution count. As the setting types, there are "host I/F priority", which executes processing related to the host I/F 111 on a priority basis, "disk I/F priority", which executes processing related to the disk I/F 141 on a priority basis, and "coequal", which executes processing related to the host I/F 111 and processing related to the disk I/F 141 on a coequal basis. Hereinafter, these types may be called the host I/F priority mode, the disk I/F priority mode, and the coequal mode (or both I/Fs coequal mode).

The host I/F processing execution count field 232 stores an upper limit value ULNeh for the number of times that processing related to the host I/F 111 is executed for each setting type. The disk I/F processing execution count field 233 stores an upper limit value ULNed for the number of times that processing related to the disk I/F 141 is executed for each setting type.

In the case of "host I/F priority", the upper limit value ULNeh1 for the number of times host I/F processing is executed is set so as to be larger than the upper limit value ULNed1 for the number of times disk I/F processing is executed (ULNeh1>ULNed1).

In the case of "coequal", the upper limit value ULNeh2 for the number of times host I/F processing is executed is set so as to be equal to the upper limit value ULNed2 for the number of times disk I/F processing is executed (ULNeh2=ULNed2).

In the case of "disk I/F priority", the upper limit value ULNeh3 for the number of times host I/F processing is executed is set so as to be smaller than the upper limit value ULNed3 for the number of times disk I/F processing is executed (ULNeh3<ULNed3).

The configuration may be such that the upper limit values ULNeh, ULNed can be set manually from the management console 20 by the user. In addition, for example, in a case where the FEPKs 110 have been augmented and the number of host I/Fs 111 has increased, the configuration may be such that the upper limit value ULNeh of the number of times that host I/F processing is executed automatically increases. Similarly, for example, in a case where the BEPKs 140 have been augmented and the number of disk I/Fs 141 has increased, the upper limit value ULNed of the number of times that disk I/F processing is executed may be set so as to increase automatically. By contrast, in a case where a FEPK 110 has been removed from the storage system 10 (at reduction time), the upper limit value ULNeh may be automatically decreased. Similarly, in a case where a BEPK 140 has been removed from the storage system 10, the upper limit value ULNed may be automatically decreased.

FIG. 7 shows a table 240 for managing the execution count. The execution count table 240 comprises a processing type field 241, an execution count field 242, and an execution count limit field 243.

The processing type field 241 stores the type of processing that is executed by the MP 121. The processing types are "host I/F processing" and "disk I/F processing. The execution count field 242 stores the execution count for each type of processing. The number of times that host I/F processing is executed is expressed as Neh, and the number of times that disk I/F processing is executed is expressed as Ned.

The execution count limit field 243 stores the upper limit value of the execution count for each type of processing. The upper limit value of the execution count for host I/F processing is ULNeh, and the upper limit value of the execution count for disk I/F processing is ULNed. These upper limit values ULNeh, ULNed are determined in accordance with the table 230 described using FIG. 6.

FIG. 8 shows a table 250 for managing processing that is to be executed cyclically. The cyclic processing table 250 comprises a processing type field 251, a next execution time field 252, and a cycle field 253.

The processing type field 251 stores the type of processing that is to be executed cyclically. The processing (cyclic processing) to be executed cyclically, for example, may include "processing for reviewing the upper limit value of the execution count" and "processing for creating a host data HDD write process".

The "processing for reviewing the upper limit value of the execution count" is for reviewing whether or not the upper limit values ULNeh, ULNed stored in the execution count limit field 243 of the table 240 shown in FIG. 7 are appropriate. The execution count upper limit values ULNeh, ULNed are changed regularly so as to constitute values that conform to the operating status of the storage system 10.

The "processing for creating a host data HDD write process" is for creating a write processing request for writing host data to the HDD 170. To assure that there is free space in the CM 131, the dirty data that has accumulated in the CM 131 is cyclically written to the HDD 170.

The next execution time field 252 stores the next execution time T for each type of processing. The next execution time, for example, is set using the value of a system timer inside the storage system 10. The cycle field 253 stores the execution cycle Cyc for each processing type.

The configuration may be such that the next execution time and the cycle are able to be set manually by the user via the management console 20. Further, the configuration may be such that the next execution time and the cycle automatically change in accordance with a configuration change in the storage system 10. For example, in a case where the number of host I/Fs 111 increases, it is possible to prevent the CM 131 from filling up with dirty data by shortening the execution cycle Cyc 2 of the processing for creating a host data HDD write process.

FIG. 9 is a table 260 for managing a threshold for setting the upper limit value of the execution count. The table 260 manages the threshold, which becomes the trigger for executing the processing for reviewing the upper limit value of the execution count. The table 260 comprises a reference information field 261 and a threshold field 262.

The reference information field 261 stores the names of information that constitutes the criteria for determining an execution trigger. The reference information, for example, may include the "MP rate of operation" and the "cache dirty ratio".

Figure 15:
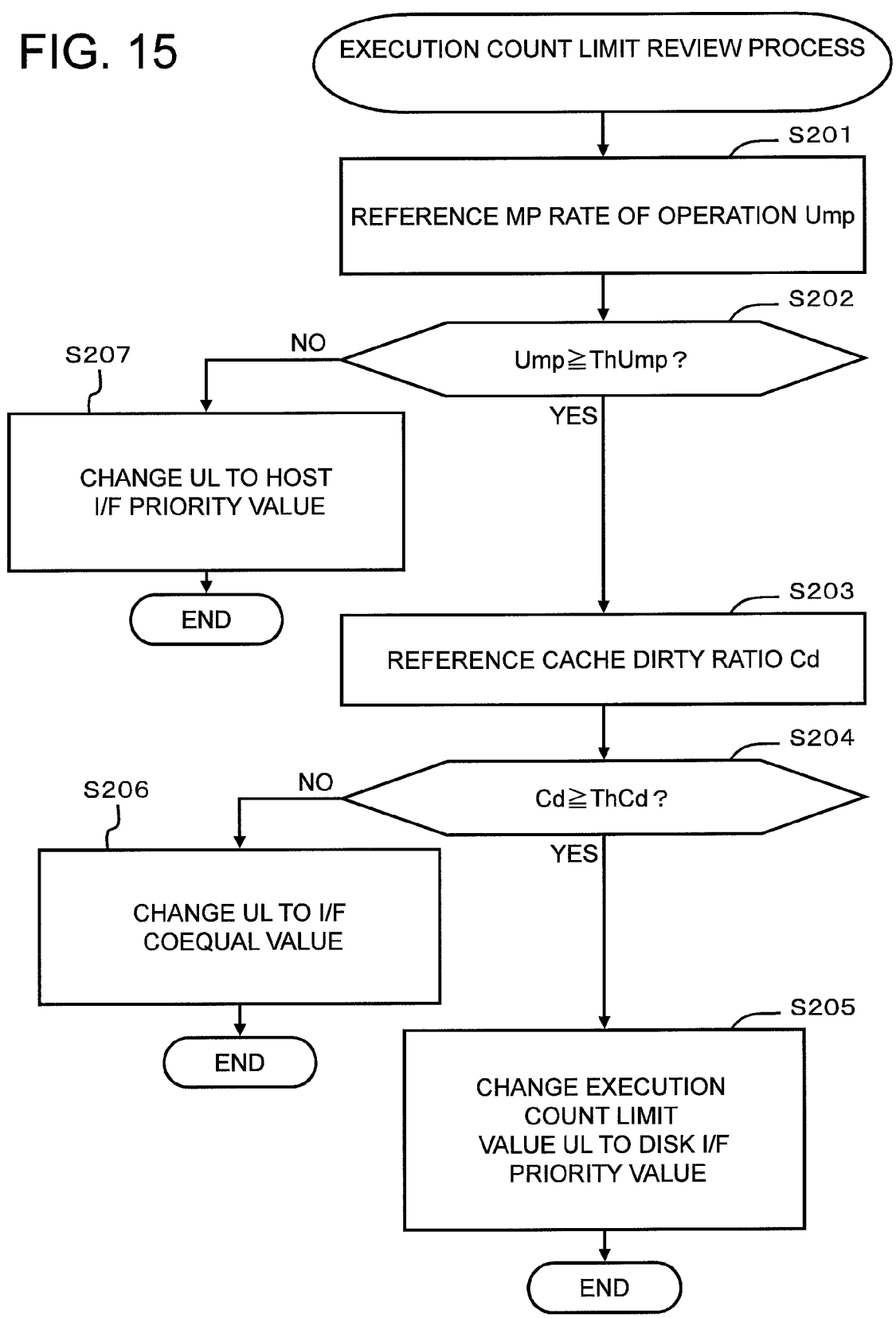
FIG. 15 is a flowchart showing processing for reviewing the upper limit value of the execution count.

The threshold field 262 stores a threshold for each piece of reference information. The threshold of the MP rate of operation is ThUmp, and the threshold of the cache dirty ratio is ThCd. The configuration may be such that these thresholds are able to be set manually by the user via the management console 20. In addition, the configuration may be such that the trigger for executing the processing (FIG. 15) for reviewing the execution count upper limit value is determined using other reference information. For example, the configuration may be such that the trigger for executing the processing shown in FIG. 15 is determined on the basis of the number of processing requests accumulated in the host I/F synchronous processing queue, the amount of untransferred data in an asynchronous remote copy, and a change in the configuration of the storage system 10.

Figure 10:
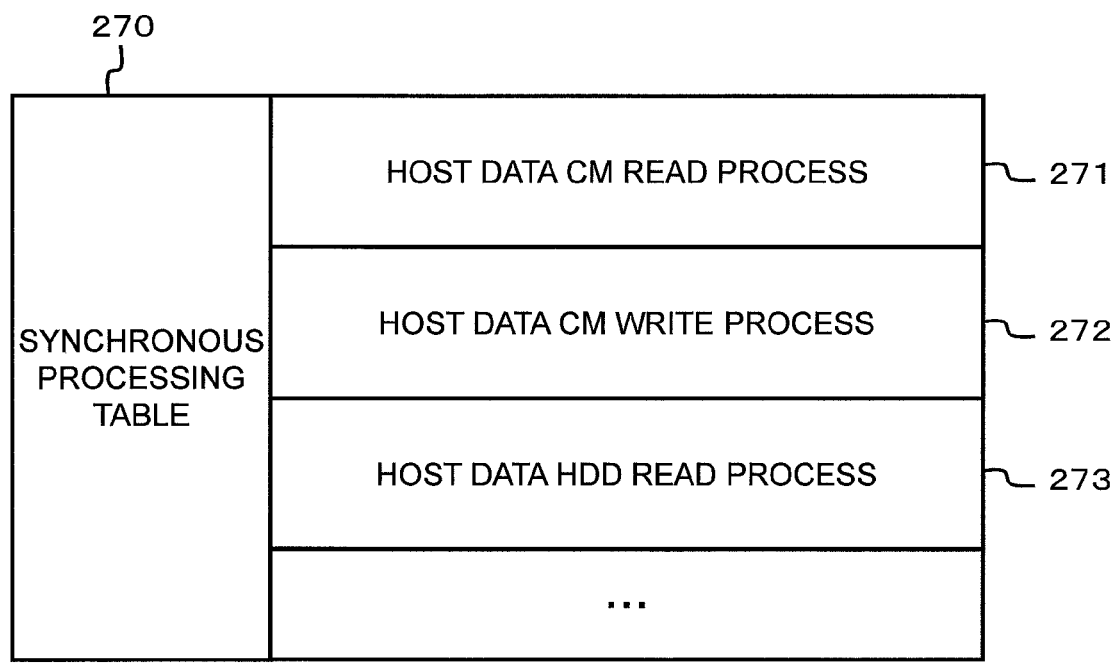
FIG. 10 is a table for managing synchronous processing.

FIG. 10 shows a table 270 for managing synchronous processing. The synchronous process table 270 manages the type of the synchronous processing. Multiple synchronous processing names are registered in the synchronous process table 270. Synchronous processing, for example, may include a host data CM read process 271, a host data CM write process 272, and a host data HDD read process 273. Synchronous processing is not limited to the processes shown in FIG. 10. For example, the copy process in a synchronous remote copy process is also a type of synchronous processing.

Figure 11:
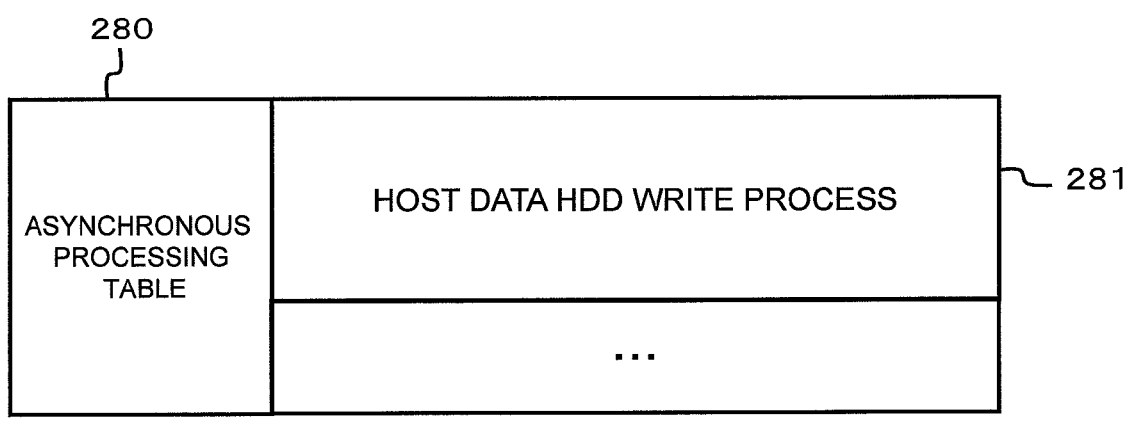
FIG. 11 is a table for managing asynchronous processing.

FIG. 11 shows a table 280 for managing asynchronous processing. The asynchronous process table 280 manages the type of asynchronous processing. An asynchronous processing name is registered in the asynchronous process table 280. Asynchronous processing, for example, may include a host data HDD write process 281. An asynchronous process is one that is specified from among respective processes other than synchronous processes. Asynchronous processing is not a trigger for executing an I/O request from the host computer 180, but rather is executed either in a case where the status inside the storage system 10 constitutes a prescribed status or in a case where an instruction has been inputted from the management console 20.

Beside that shown in FIG. 11, asynchronous processing, for example, may include an asynchronous local copy process, an asynchronous remote copy process, a copy function initial copy process, an owner rights transfer process, a failure recovery process, a logical volume setting process, a storage system configuration change process, and a formatting process.

The asynchronous local copy process transfers data from a copy-source logical volume to a copy-destination logical volume inside a single storage system 10 at a timing that differs from the timing of the write to the copy-source logical volume.

The asynchronous remote copy process transfers data from a copy-source logical volume disposed in one storage system to a copy-destination logical volume disposed in another storage system at a timing that differs from the timing of the write to the copy-source logical volume.

The copy function initial copy process transfers all the data of the copy-source logical volume to the copy-destination logical volume at pair creation time in a synchronous local copy, an asynchronous local copy, a synchronous remote copy, and an asynchronous remote copy.

The owner rights transfer process transfers owner rights between MPs. The owner rights signify access authorization to a logical volume. Only an MP that comprises the owner rights to a logical volume is able to access and read/write data from/to this logical volume.

The failure recovery process is for recovering from a failure, and, for example, is a correction copy process and a copy process to a spare drive. The correction copy process restores the data inside an HDD 170 in which a failure occurred based on the data and parity read from this HDD and the respective other HDDs 170 that belong to the same RAID group. The data restored in accordance with a logical operation, for example, is stored in a spare HDD 170.

The logical volume setting process either creates or deletes a new logical volume. Each MP must recognize this setting change.

The storage system configuration change process is executed either in a case where a new package has been attached to the storage system 10, or in a case where an existing package has been removed from the storage system 10. In a case where the configuration of the storage system 10 has changed, each MP must recognize this configuration change.

The formatting process is for formatting a logical volume 171. The asynchronous processes mentioned above are given as examples, and the present invention is not limited to these asynchronous processes.

The operation of the storage system 10 and the operation of the management console 20 will be explained by referring to FIGS. 12 through 26. The flowcharts described below give overviews of the respective processes, and may differ from the actual computer programs. A so-called person skilled in the art should be able to change a portion of a step shown in the drawing and add or delete a new step. A step will be abbreviated as S hereinbelow.

Figure 12:
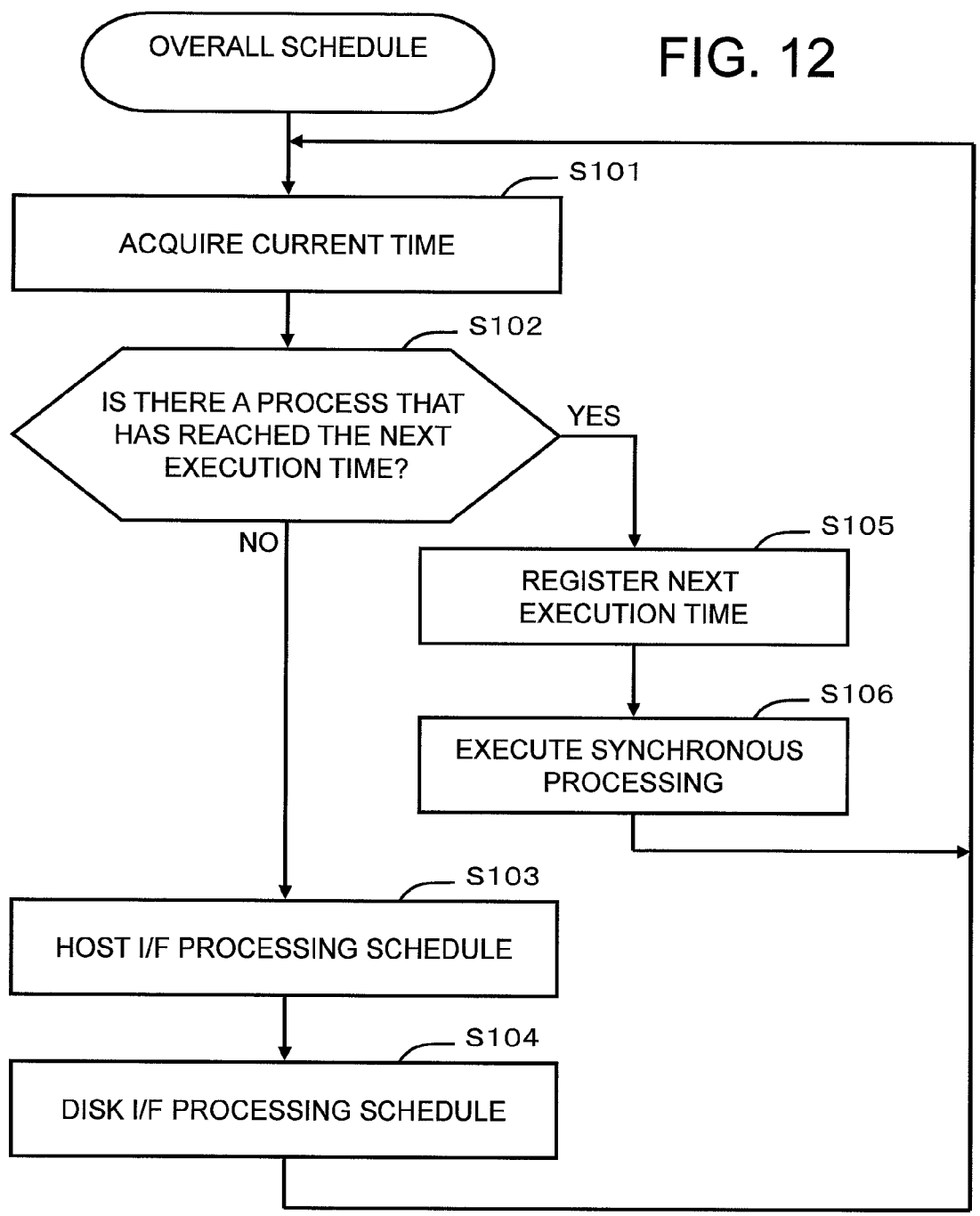
FIG. 12 is a flowchart showing overall processing.

FIG. 12 shows the entire scheduling process executed by each MP 121. The MP 121 acquires the current time from the system timer (S101). The MP 121 determines whether or not there is a cyclic process that has reached the next execution time stored in the next execution time field 252 of the cyclic processing table 250 shown in FIG. 8 (S102).

In a case where the cyclic processing has not reached the execution time (S102: NO), the MP 121 executes the host I/F processing schedule (S103) and the disk I/F schedule (S104) and returns to S101.

In a case where the cyclic processing has reached the execution time (S102: YES), the MP 121 calculates the next execution time from the current time and the cycle registered in the cycle field 253, and stores this time in the next execution time field 252 (S104). The MP 121 executes the cyclic processing that has reached the execution time (S106), and returns to S101.

Furthermore, the execution order of the host I/F schedule and the disk I/F schedule may be transposed in FIG. 12. That is, the disk I/F schedule may be executed ahead of the host I/F schedule.

Figure 13:
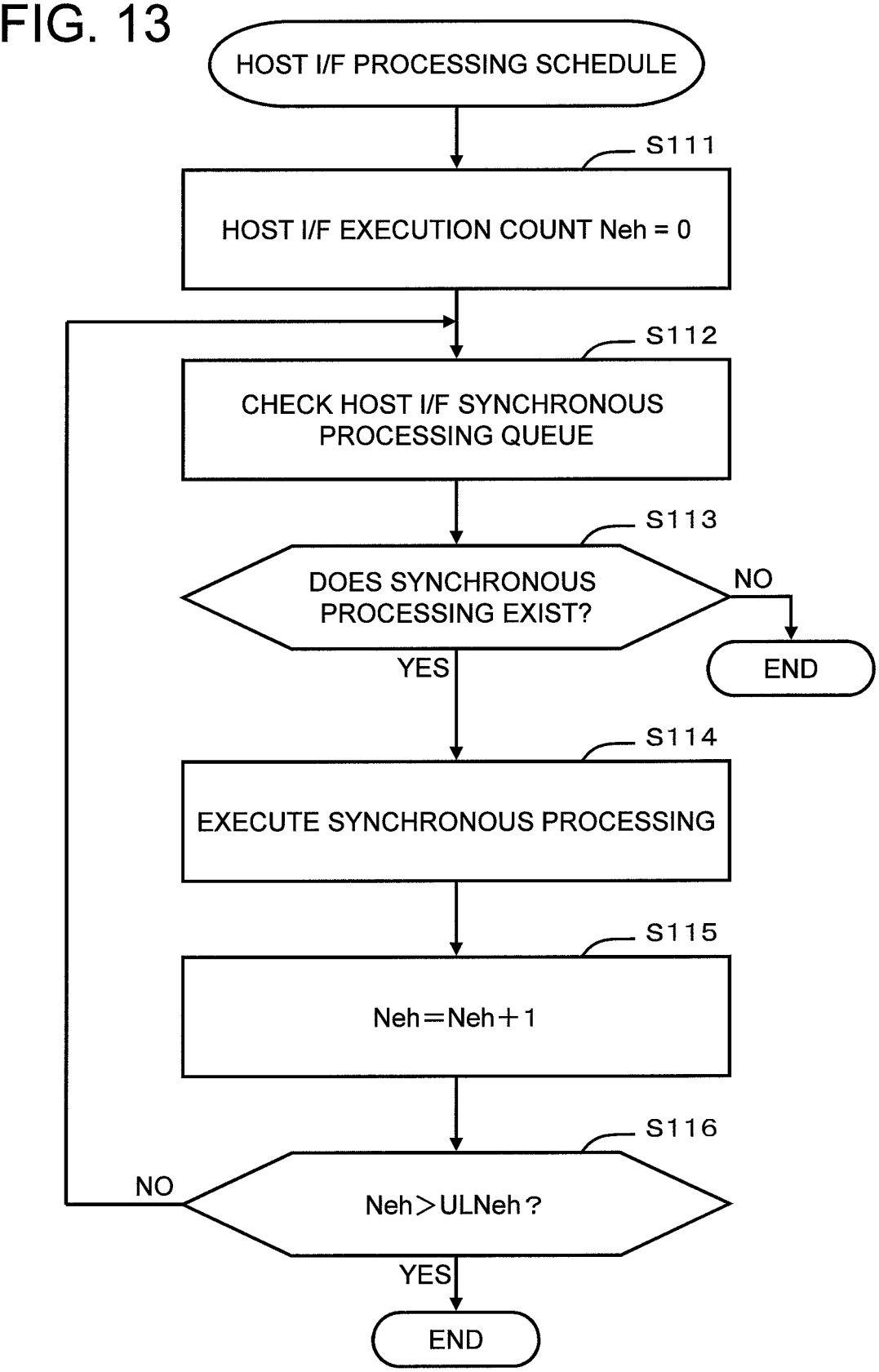
FIG. 13 is a flowchart showing host interface processing.

FIG. 13 shows the host I/F schedule processing. The processing of FIG. 13 is a detailed account of the processing shown in S103 in FIG. 12. The MP 121 resets the value of the Neh, which shows the number of times that the host I/F processing has been executed (S111), and checks the host I/F synchronous processing queue 410 (S112).

The MP 121 determines whether or not a synchronous processing request exists in the host I/F synchronous processing queue 410 (S113). In a case where a synchronous processing request does not exist in the host I/F synchronous processing queue 410 (S113: NO), this processing ends.

In a case where a synchronous processing request does exist in the host I/F synchronous processing queue 410 (S113: YES), the MP 121 fetches one synchronous processing request from the queue 410, and executes this synchronous processing (S114).

After executing one synchronous process, the MP 121 increments by one the execution count Neh of the host I/F processing (S115). The MP 121 determines whether or not the execution count Neh has exceeded the upper limit value ULNeh (S116). In a case where the execution count Neh has exceeded the upper limit value ULNeh (S116: YES), this processing ends. In a case where the execution count Neh has not exceeded the upper limit value ULNeh (S116: NO), the MP 121 returns to S112, and checks the host I/F synchronous processing queue 410 once again. Furthermore, in S116, it is determined whether or not the execution count Neh has exceeded the upper limit value ULNeh (Neh>ULNeh), but the configuration may be such that a determination as to whether or not the execution count Neh is equal to or larger than the upper limit value ULNeh (Neh>=ULNeh) may be made instead.

Figure 14:
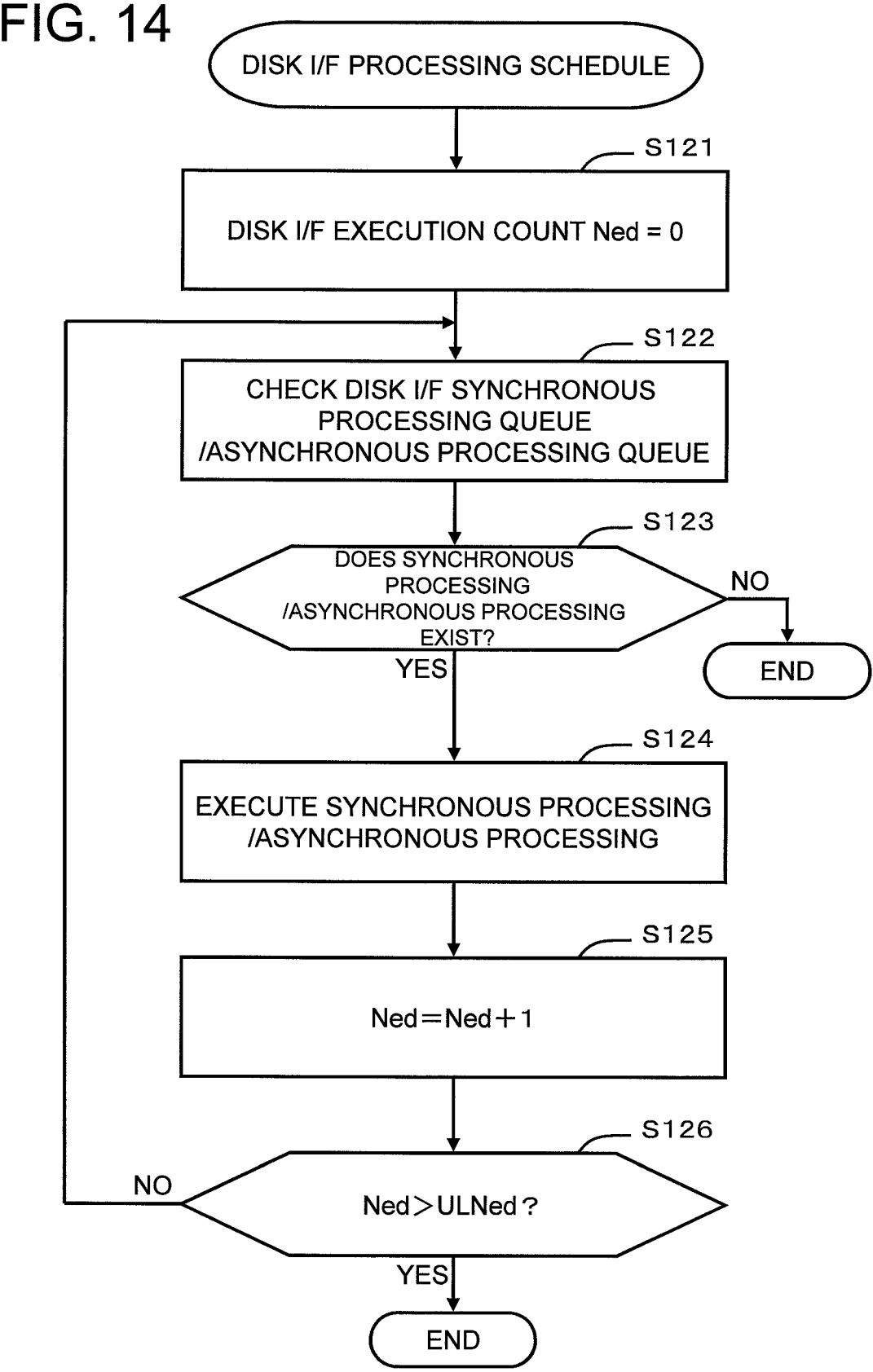
FIG. 14 is a flowchart showing disk interface processing.

FIG. 14 shows a disk I/F processing schedule. The processing of FIG. 14 is a detailed account of the processing shown in S104 in FIG. 12. The MP 121 resets the value of the Ned, which shows the number of times that disk I/F processing has been executed (S121), and respectively checks the disk I/F synchronous processing queue 420 and the disk I/F asynchronous processing queue 430 (S122).

The MP 121 determines whether a processing request exists in either the disk I/F synchronous processing queue 420 or the disk I/F asynchronous processing queue 430 (S123). In a case where a processing request does not exist in either of the queues 420, 430 (S123: NO), this processing ends.

In a case where a processing request exists in either the disk I/F synchronous processing queue 420 or the disk I/F asynchronous processing queue 430 (S123: YES), the MP 121 executes either one of the disk I/F synchronous processing or the disk I/F asynchronous processing. In a case where a processing request exists in the disk I/F synchronous processing queue 420, the MP 121 executes this synchronous processing. In a case where a processing request exists in the disk I/F asynchronous processing queue 430, the MP 121 executes this asynchronous processing.

The MP 121 increments by one the value of the execution count Ned of the disk I/F processing (S125). The MP 121 determines whether of not the execution count Ned has exceeded the upper limit value ULNed (S126).

Furthermore, in S126, it is determined whether or not the execution count Ned has exceeded the upper limit value ULNed (Ned>ULNed), but the configuration may be such that a determination as to whether or not the execution count Ned is equal to or larger than the upper limit value ULNed (Ned>=ULNed) may be made instead.

The configuration may also be such that the MP 121 either alternately executes a processing request stored in the disk I/F synchronous processing queue 420 and a processing request stored in the disk I/F asynchronous processing queue 430, or executes either the synchronous processing or the asynchronous processing on a priority basis depending on the circumstances. For example, the configuration may be such that in a case where the cache dirty ratio is equal to or larger than a prescribed value, the a host data HDD write process is executed as disk I/F asynchronous processing ahead of disk I/F synchronous processing.

FIG. 15 shows processing for reviewing the upper limit value of the execution count. This is one example of processing that is executed cyclically, and the execution count upper limit values ULNeh, ULNed are updated at prescribed cycles in accordance with the status of the storage system 10. This makes it possible for the MP 121 to only execute host I/F processing and disk I/F processing the appropriate number of times.

First, the MP 121 references the MP rate of operation Ump based on the MP rate of operation table 210 shown in FIG. 4 (S201). The MP 121 compares the MP rate of operation Ump to the MP rate of operation threshold ThUmp stored in the threshold table 260 shown in FIG. 9, and determines whether or not the MP rate of operation Ump is equal to or larger than the threshold ThUmp (S202).

The configuration here may be such that the MP 121 respectively compares the three MP rates of operation Umpa, Umph, Umpd stored in the table 210 of FIG. 4 to the one threshold ThUmp, and determines whether or not any one of the MP rates of operation is equal to or larger than the threshold ThUmp. Or, the configuration may be such that the thresholds ThUmpa, ThUmph, ThUmpd respectively corresponding to the MP rates of operation Umpa, Umph, Umpd are stored in the table shown in FIG. 9, and Umpa is compared to ThUmpa, Umph is compared to ThUmph, and Umpd is compared to ThUmpd, respectively. Or, the configuration may be such that a determination is made only as to whether all of the rates of operation Umpa are equal to or larger than the ThUmp.

In a case where the MP rate of operation is equal to or larger than the threshold ThUmp (S202: YES), the MP 121 references the cache dirty ratio Cd in the table 220 shown in FIG. 5 (S203). The MP 121 compares the cache dirty ratio Cd acquired from the table 220 to a threshold ThCd stored in the table 260 shown in FIG. 9, and determines whether or not the cache dirty ratio Cd is equal to or larger than the threshold ThCd (S204).

In a case where the cache dirty ratio Cd is equal to or larger than the threshold ThCd (S204: YES), the MP 121 sets the execution count upper limit value UL in the ULNeh3 and ULNed3 as the values for the "disk I/F priority" (S205).

That is, in a case where the MP rate of operation Ump is equal to or larger than the threshold ThUmp (S202: YES), and, in addition, the cache dirty ratio Cd is equal to or larger than the threshold ThCd (S204: YES), the MP 121 sets the upper limit value that enables the execution of disk I/F processing in the ULNed3.

As described hereinabove, the execution count upper limit value ULNeh3 of the disk I/F processing at the time of disk I/F priority is set higher than the execution count upper limit value ULNeh3 of the host I/F processing. Therefore, the disk I/F processing is performed on a priority basis. As a result of this, the dirty data accumulated in the CM 131 is written to the HDD 170, thereby increasing the CM 131 free space.

In a case where the cache dirty ratio Cd is less than the threshold ThCd (S204: NO), the MP 121 sets the execution count upper limit values UL in the ULNeh2 and ULNed2 as the value for "coequal" (S206). That is, in a case where the MP rate of operation Ump is equal to or larger than the threshold ThUmp (S202: YES), and, in addition, the cache dirty ratio Cd is less than the threshold ThCd (S204: NO), the MP 121 makes the count ULNed2 that enables the execution of the disk I/F processing equal to the count ULNeh2 that enables the execution of the host I/F processing (ULNed2=ULNeh2). This makes it possible to receive an I/O request from the host computer 180 while assuring CM 131 free space.

In a case where the MP rate of operation Ump is less than the threshold ThUmp (S202: NO), the MP 121 sets the execution count upper limit values UL in the ULNeh1 and ULNed1 as the value for the "host I/F priority" (S207). In a case where the MP rate of operation Ump is less than the threshold ThUmp, host I/F processing is executed on a priority basis, and the responsiveness of the storage system 10 is enhanced.

A host data CM read process will be explained by referring to FIGS. 16 through 18. The host data CM read process reads data from the CM 131 in accordance with a read request from the host computer 180, and transfers this data to the host computer 180 via the host I/F 111.

The MP 131 analyzes the command received via the FEPK 110 (S301), and references the read request address (S302). The read request address is the logical address (LBA) of the data with respect to which the host computer 180 is requesting the read.

The MP 121 determines whether or not a cache area corresponding to the read request address has been reserved (S303). Whether or not a cache area corresponding to the read request address has been reserved can be restated as "whether or not there was a cache hit".

In a case where a cache area corresponding to the read request address has been reserved in the CM 131 (S303: YES), that is, in the case of a cache hit (S303: YES), the read-targeted data (abbreviated as read data in the drawing) is stored in this cache area.

Accordingly, the MP 121 transfers the data stored in the cache area corresponding to the read request address to the host I/F 111 of the FEPK 110 (S304). The MP 121 requests a data transfer from the host I/F 111 to the host computer 180, and also requests that a notification to the effect that this data transfer has been completed be sent from the host I/F 111 to the MP 121 (S304). Thereafter, the MP 121 waits until the data has been transferred from the host I/F 111 to the host computer 180, and the notification to the effect that this data transfer was completed has been received from the host I/F 111 (S305).

Alternatively, in a case where a cache area corresponding to the read request address has not been reserved (S303: NO), the data requested by the host computer 180 is not stored in the CM 131. Accordingly, the MP 121 stores one processing request in the disk I/F synchronous processing queue 420 (S306), and waits for the read-targeted data to be read from the HDD 170 and stored in the CM 131 by the disk I/F 141 (S307).

As will be described hereinbelow, when the disk I/F 141 transfers the read-targeted data read from the HDD 170 and stores this data in the CM 131, the MP 121, which is carrying out the host data HDD read processing, issues a notification as to the location in which the read-targeted data was stored. The MP 121, which had been carrying out the host data CM read processing, waits for receipt of this notification (S307).

Figure 16:
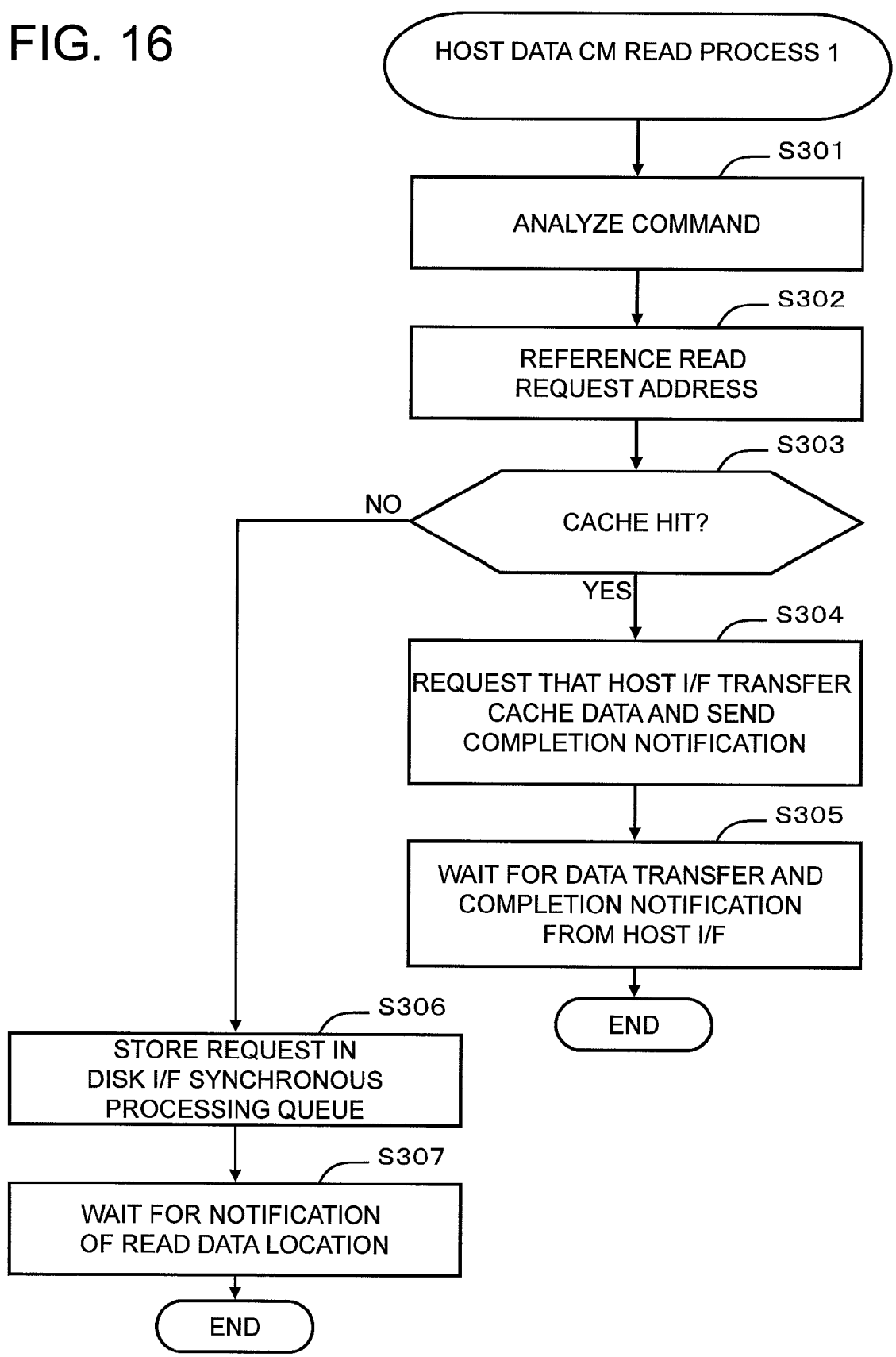
FIG. 16 is a flowchart of processing for reading read-requested host data from the cache memory.
Figure 17:
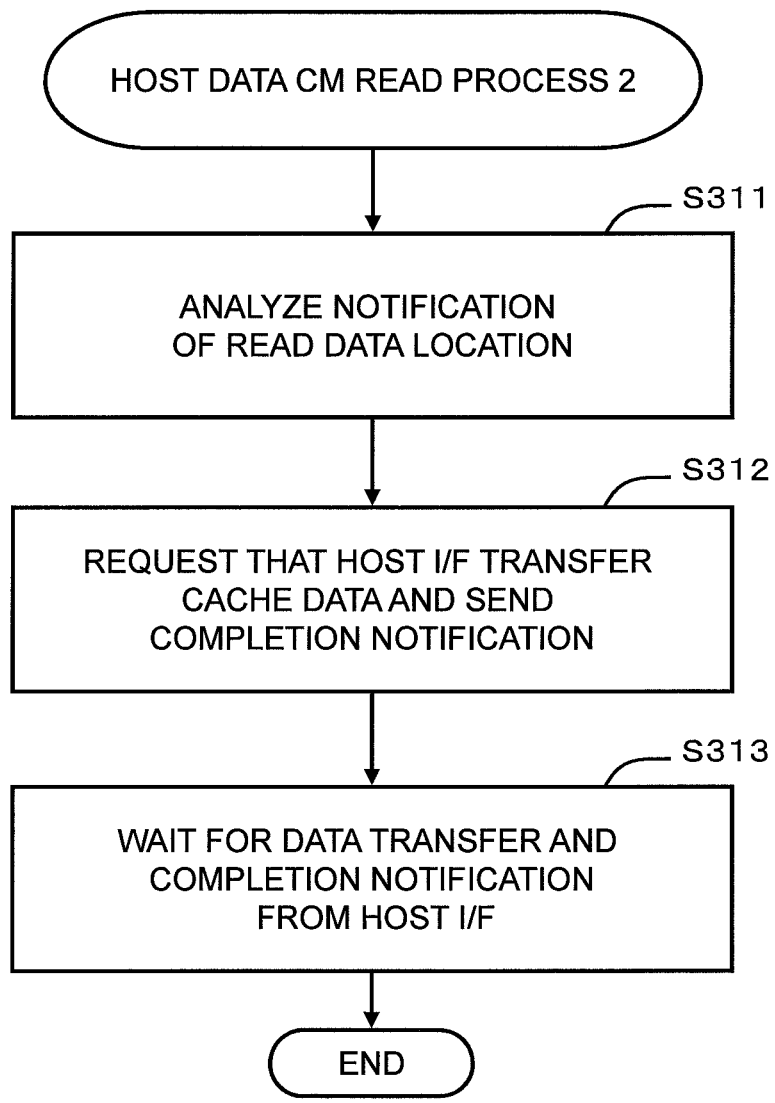
FIG. 17 is a flowchart of the continuation of the processing of FIG. 16.

FIG. 17 shows the continuation of the processing of FIG. 16. When the disk I/F 141 reads the read-targeted data from the HDD 170 and transfers this data to the CM 131, the MP 121, which is carrying out the host data HDD read processing, issues a notification as to the location in which the read-targeted data was stored. When the MP 121, which had been carrying out the host data CM read processing, receives this notification, it starts the processing shown in FIG. 17.

The MP 121 analyzes the notification that reveals the location in which the read-targeted data is stored (S311). Next, the MP 121 transfers the read-targeted data in the CM 131 to the host I/F 111, and, in addition, requests that the host I/F 111 send a notification to the extent that the data transfer to the host computer 180 has been completed (S312). The MP 131 stands by until the notification to the extent that the data transfer to the host computer 180 is complete has been sent from the host I/F 111 (S313).

Figure 18:
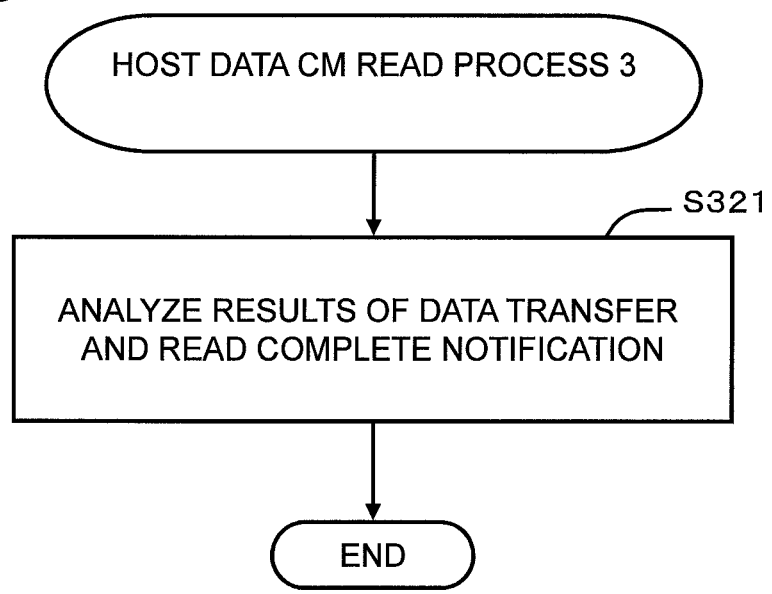
FIG. 18 is a flowchart of the continuation of the processing of FIG. 17.

FIG. 18 shows a continuation of the processing of FIG. 17 (or FIG. 16). When the MP 121 receives the completion notification from the host I/F 111, the MP 121 analyzes the contents of this notification, and ends the host data CM read processing (S321).

Host data CM write processing will be explained by referring to FIGS. 19 through 21. The host data CM write process stores write-targeted data received from the host computer 180 in the CM 131 in accordance with a write request from the host computer 180.

The MP 121 analyzes the command received from the host I/F 111 (S401), and references the write request address that is included in this command (S402). The MP 121 determines whether or not a cache area corresponding to the write request address has been reserved in the CM 131 (S403).

In a case where a cache area corresponding to the write request address has not been reserved in the CM 131 (S403: NO), the MP 121 reserves a cache area corresponding to the write request address in the CM 131 (S404).

When the MP 121 reserves a cache area corresponding to the write request address in the CM 131, the MP 121 requests that the host I/F 111 receive the data from the host computer 180 (S405). The MP 121 waits for a notification to the extent that the receipt of the data from the host computer 180 has been completed to be sent from the host I/F 111 (S406).

Figure 19:
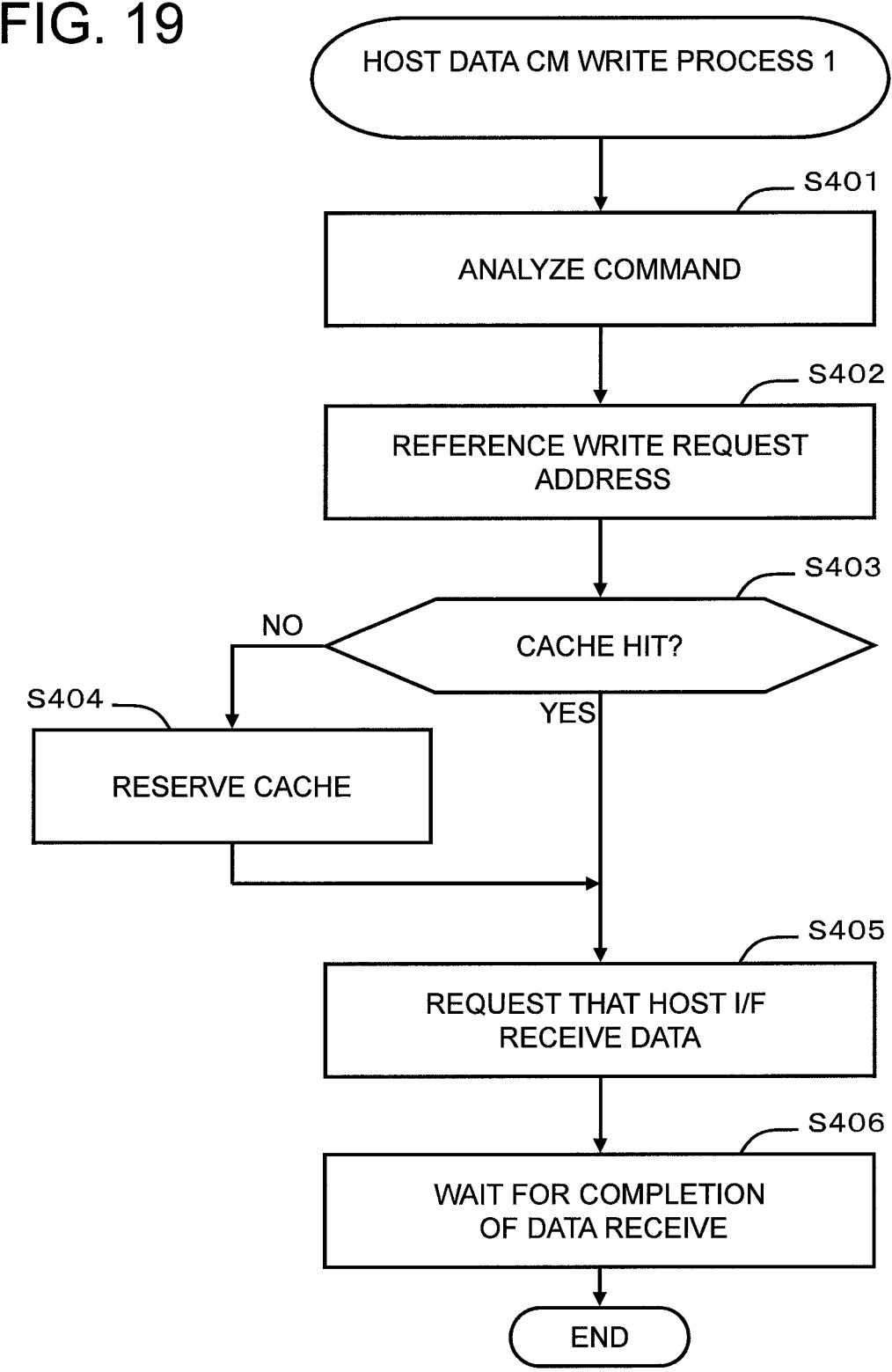
FIG. 19 is a flowchart showing the processing for writing write-requested host data to the cache memory.
Figure 20:
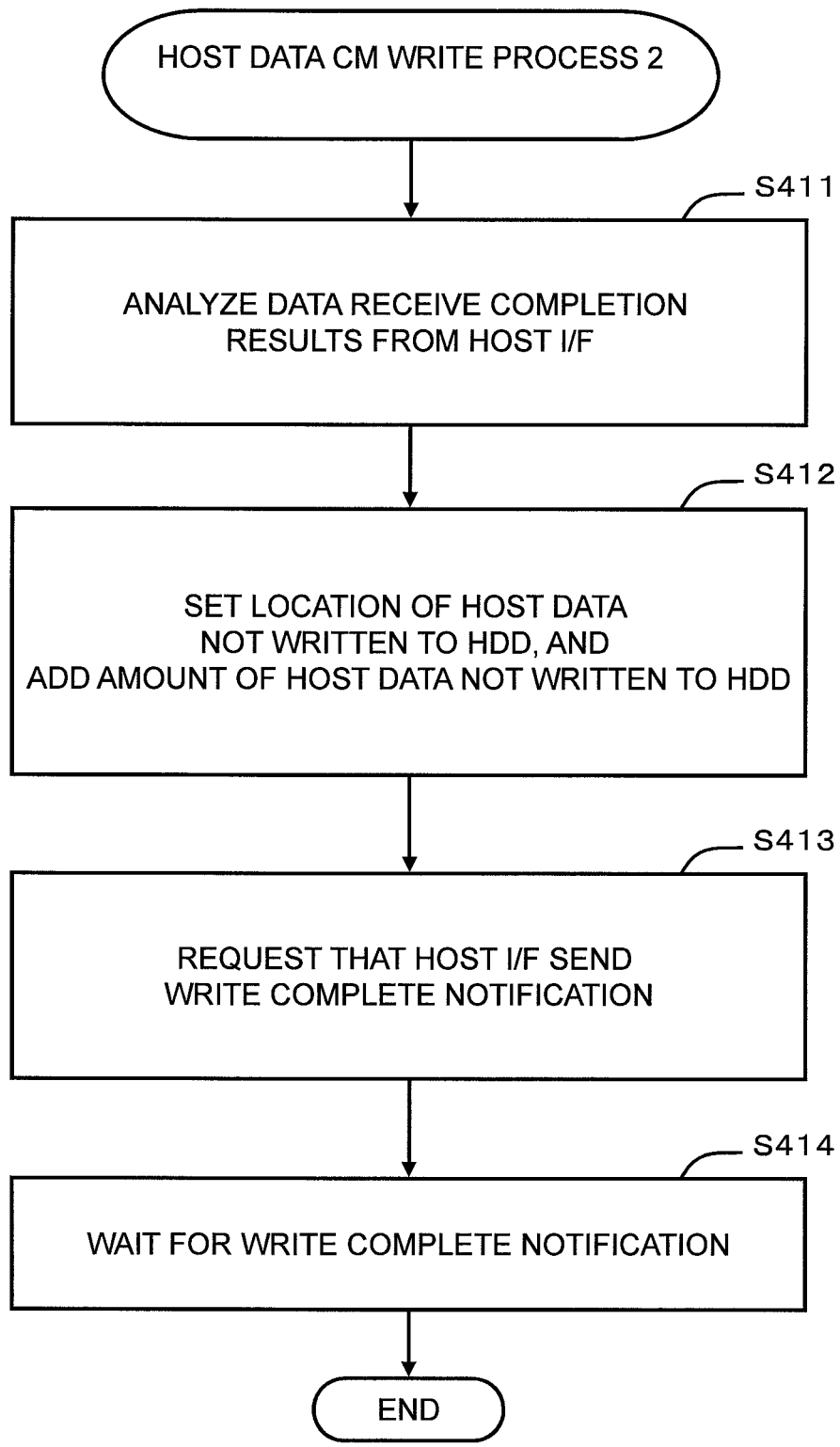
FIG. 20 is a flowchart of the continuation of the processing of FIG. 19.

FIG. 20 is a flowchart showing the continuation of the processing of FIG. 19. When the receipt of data from the host computer 180 is complete, the host I/F 111 sends a notification to the MP 121 to the extent that the reception of the data has been completed. The MP 121 analyzes the results of the notification from the host I/F 111 (S411).

The MP 121 sets the CM 131 storage location of the data (the data that is in the dirty state. Also called dirty data) that has yet to be written to the HDD 170, and, in addition, adds up the amount of dirty data (S412). In other words, the MP 121 stores the write-destination access of the dirty data, and, in addition, updates the total amount of the dirty data (S412).

The MP 121 requests that the host I/F 111 send a write-complete notification to the host computer 180 (S413). The MP 121 waits for a notification showing that the write-complete notification has been sent to the host computer 180 to be sent from the host I/F 111 (S414).

Figure 21:
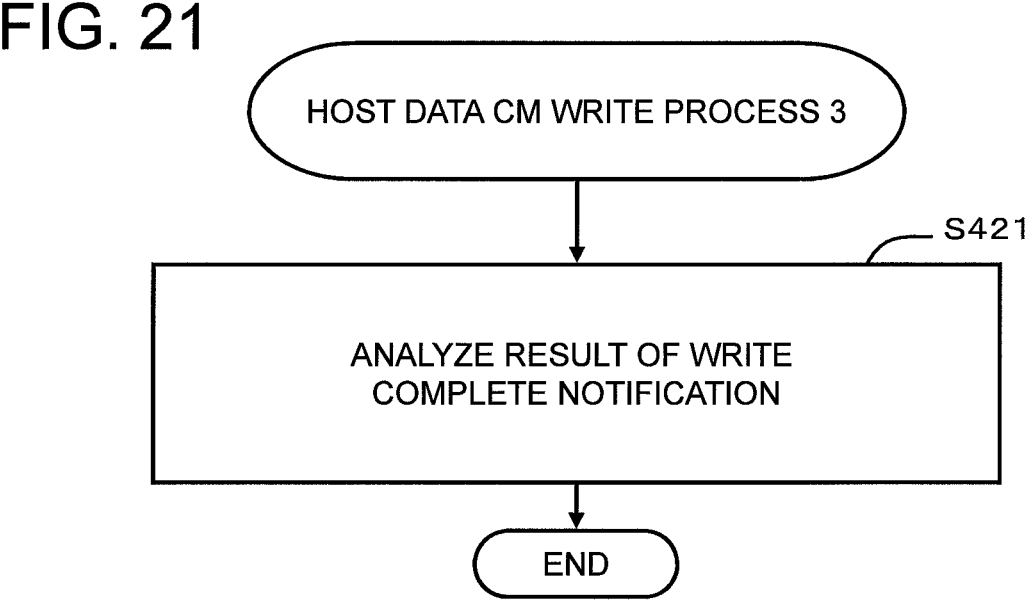
FIG. 21 is a flowchart of the continuation of the processing of FIG. 20.

FIG. 21 shows a continuation of the processing of FIG. 20. When the MP 121 receives the notification to the extent that the write-complete notification has been sent from the host I/F 111, the MP 121 analyzes the result, and ends the host data CM write processing (S421).

Host data HDD read processing will be explained by referring to FIGS. 22 and 23. The host data HDD read processing is for reading data requested by the host computer 180 from the HDD 170 and storing this data in the CM 131, and is also called a staging process.

The MP 121 references the read request address (S501), and determines whether or not a cache area corresponding to the read request address has been reserved in the CM 131 (S502). In a case where a cache area has not been reserved (S502: NO), the MP 121 reserves a cache area (S503).

The MP 121 requests that the disk I/F 141 receive the data (S504). That is, the MP 121 requests that the disk I/F 141 read the data from the HDD 170. Then, the MP 121 waits for the data read from the HDD 170 by the disk I/F 141 to be complete (S505).

Figure 22:
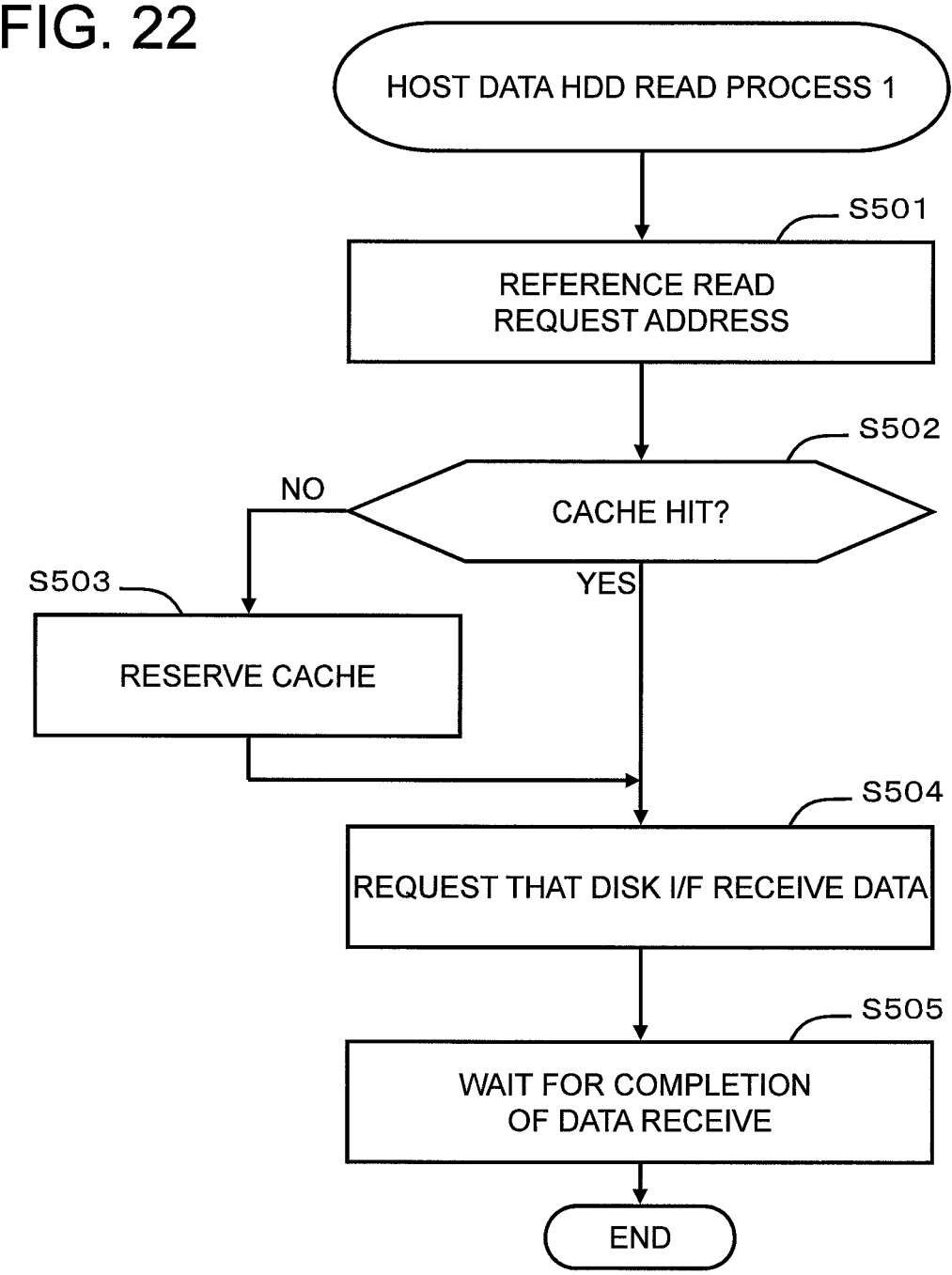
FIG. 22 is a flowchart showing the processing for reading data from the storage device.
Figure 23:
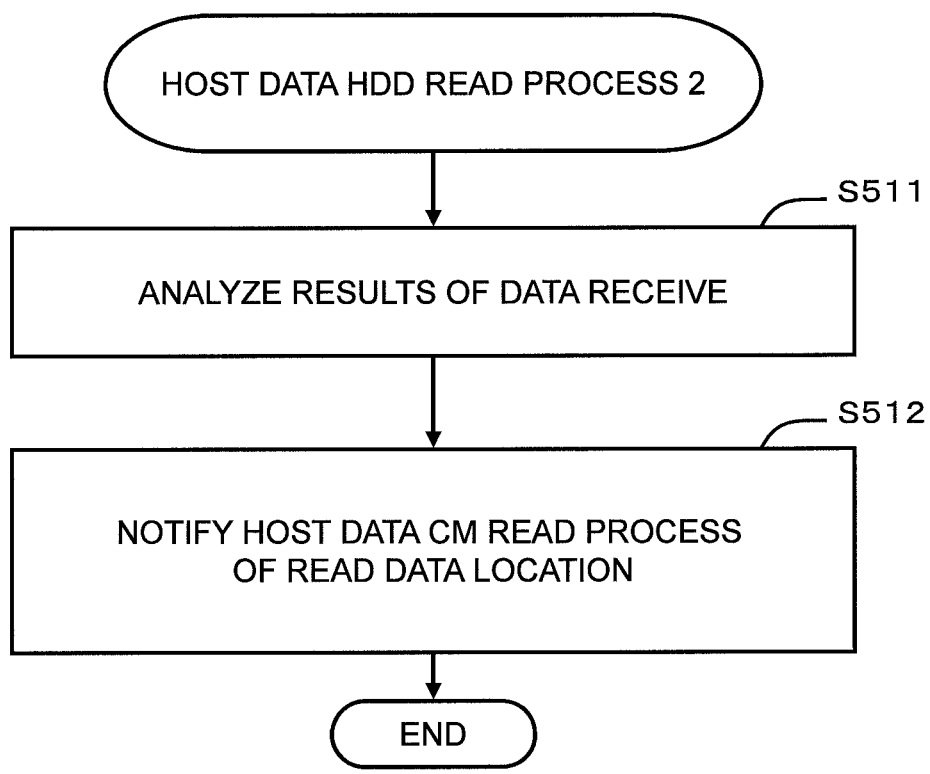
FIG. 23 is a flowchart of the continuation of the processing of FIG. 22.

FIG. 23 shows a continuation of the processing in FIG. 22. The MP 121, upon receiving a notification from the disk I/F 141 to the extent that data receipt has been completed, analyzes the reception results (S511). The MP 121 issue a notification as to the location of the data that was read from the HDD 170 and stored in the CM 131 in the host data CM read processing (S311 of FIG. 17) (S512).

Host data HDD write processing will be explained by referring to FIGS. 24 and 25. The host data HDD write processing is for writing the dirty data stored in the CM 131 to the HDD 170, and is also called a destaging process.

The MP 121 references the write request address (S601), and requests that the disk I/F 141 transfer the data (S602). The MP 121 waits for a notification to the extent that the data transfer has been completed by the data I/F 141 (S603).

The data transfer by the disk I/F 141 signifies that the disk I/F 141 transfers and writes to the HDD 170 the data (the write-targeted data, and data that is in the dirty state) that is stored in the CM 131.

Figure 24:
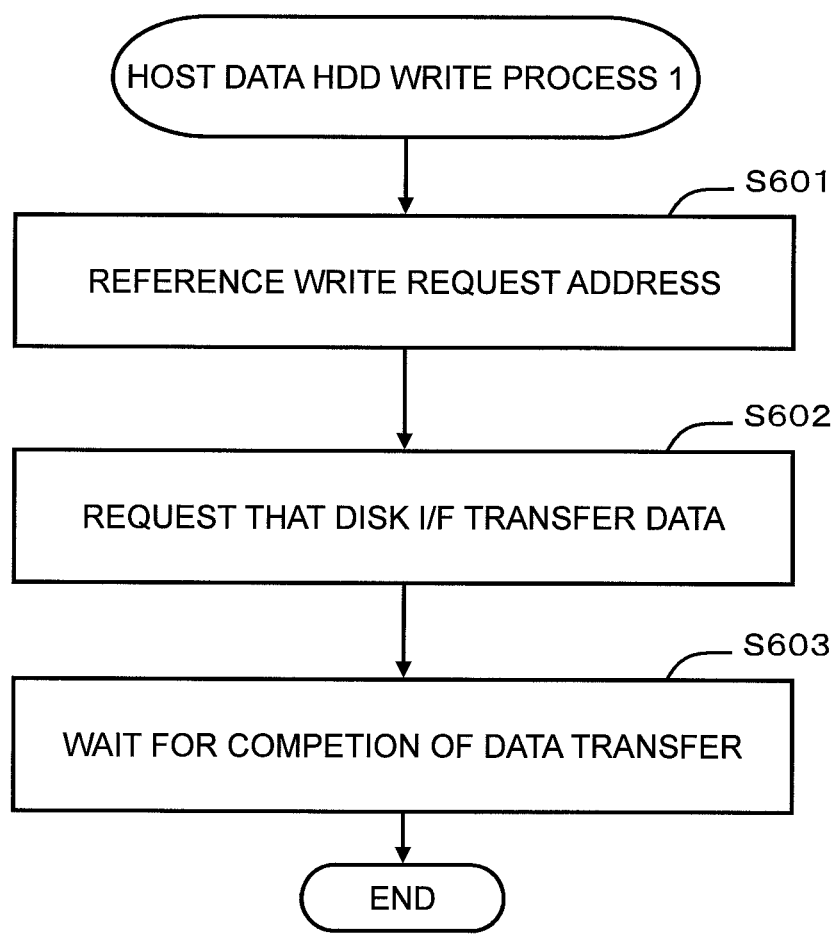
FIG. 24 is a flowchart showing the processing for writing host data to the storage device.
Figure 25:
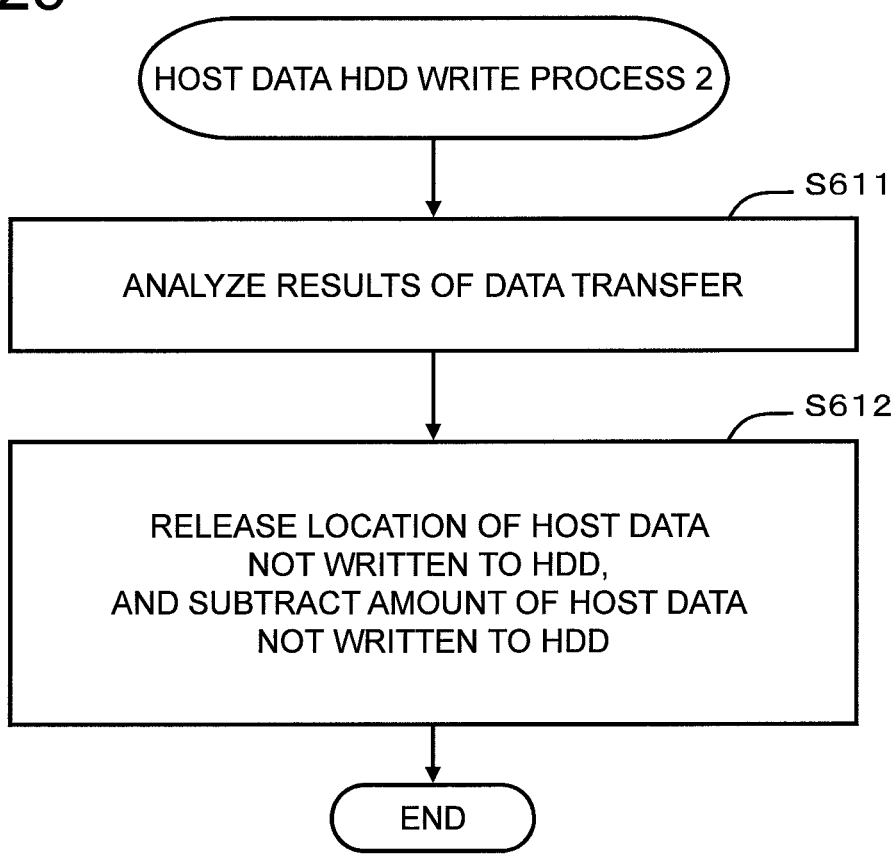
FIG. 25 is a flowchart of the continuation of the processing of FIG. 24.

FIG. 25 shows a continuation of the processing in FIG. 24. The MP 121 analyzes the notification received from the disk I/F 141 (S511). The MP 121, based on the results of this analysis, releases the location of the dirty data set in S412 of FIG. 20, and additionally reduces the total amount of dirty data (S512).

That is, the MP 121 changes the attribute of the data transferred to the HDD 170 by the disk I/F 141 from among the dirty data stored in the CM 131 from "dirty" to "clean", and, in addition, reduces the total amount of dirty data by the size of the data transferred to the HDD (S512).

Figure 26:
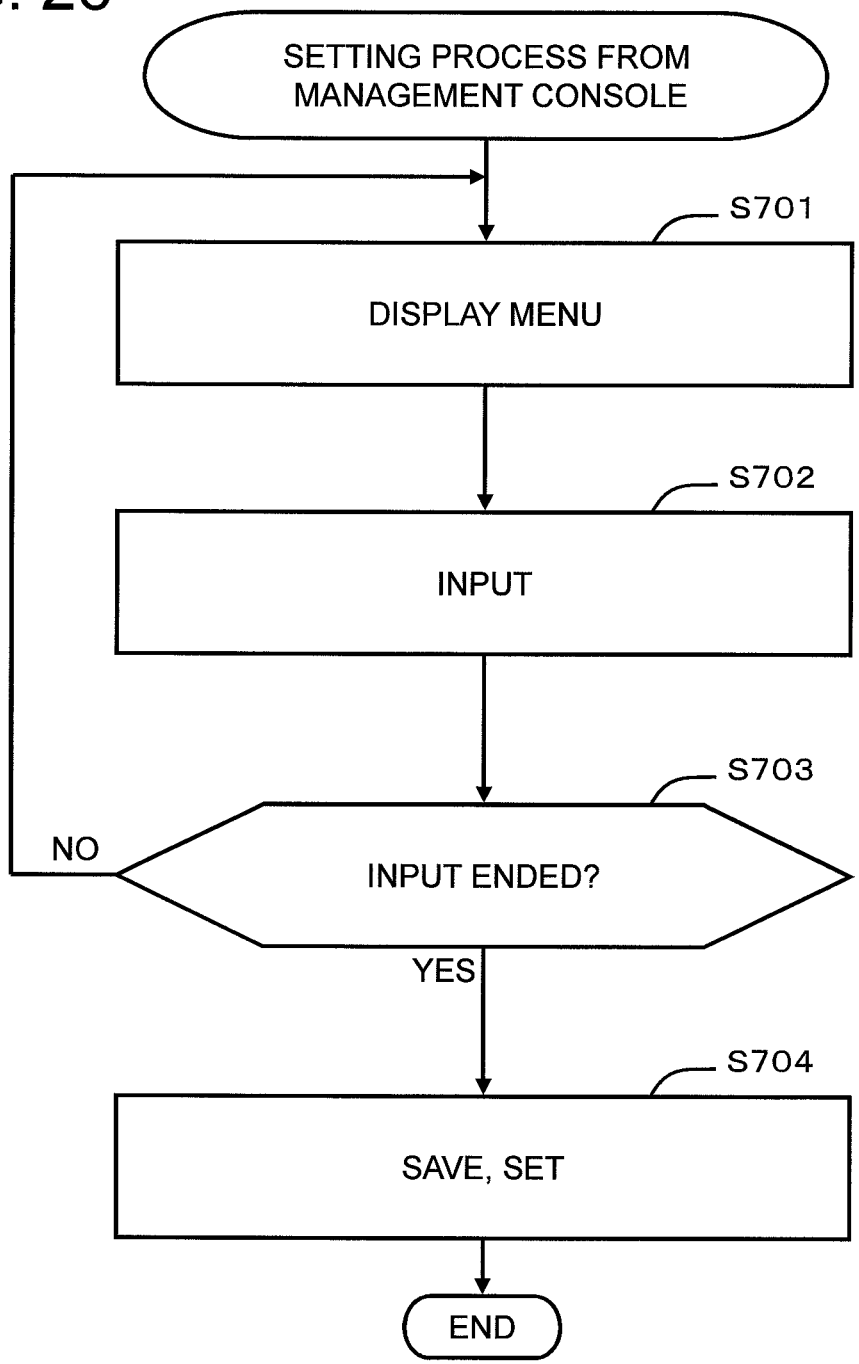
FIG. 26 is a flowchart showing the processing for setting either a limit or a threshold for an execution count from the management console.

FIG. 26 shows processing by which a user performs various types of settings using the management console 20. The management console 20 displays a menu screen G10 shown in FIG. 27 (S701), and waits for the start of an input operation by the user (S702).

The user inputs either a limit or a threshold for an execution count via the menu screen G10 (S702). The management console 20 stands by until the input operation by the user has ended (S703). In a case where the value inputted to the menu screen G10 is to be fixed, the user operates the save button B10. By contrast, in a case where the inputted value is to be cancelled, the user operates the cancel button B11.

When user inputting ends and the save button B10 is operated, the management console 20 saves the setting value inputted by the user (S704). In addition, the management console 20 sends the user-inputted setting value to the controller 100 of the storage system 10 and sets this value (S705).

FIG. 27 shows an example of the menu screen G10. The menu screen G10 comprises multiple setting sections G11, G12. The first setting section G11 is for setting the upper limit value of the execution count. The second setting section G12 is for setting a threshold for starting the process for reviewing the execution count upper limit value. Furthermore, information capable of being set in the storage system 10 from the management console 20 is not limited to the above-mentioned upper limit value and threshold.

Configuring this embodiment like this makes it possible for each microprocessor 121 to execute synchronous processing and asynchronous processing. Therefore, the MP 121 can be used efficiently.

In this embodiment, the MP 121 is able to exert control so as to execute only one of either the synchronous processing or the asynchronous processing for a long period of time. In addition, in this embodiment, the upper limit value of the number of times that host I/F processing (synchronous processing) is able to be executed, and the upper limit value of the number of times that disk I/F processing (asynchronous processing and synchronous processing) is able to be executed is changed in accordance with the status of the storage system 10 as shown in S201, S207, S204, S206 and S205. Therefore, it is possible to balance improved response related to an I/O request from the host computer 180 with efficient use of the MP 121.

In this embodiment, processing is divided between host I/F processing and disk I/F processing, and the upper limit values of the number of times that these are respectively able to be executed are set cyclically as shown in S116 and S126. Therefore, the I/O request response can be improved, and, in addition, the MP 121 can be used efficiently even when the operating status changes in various ways.

Figure 35:
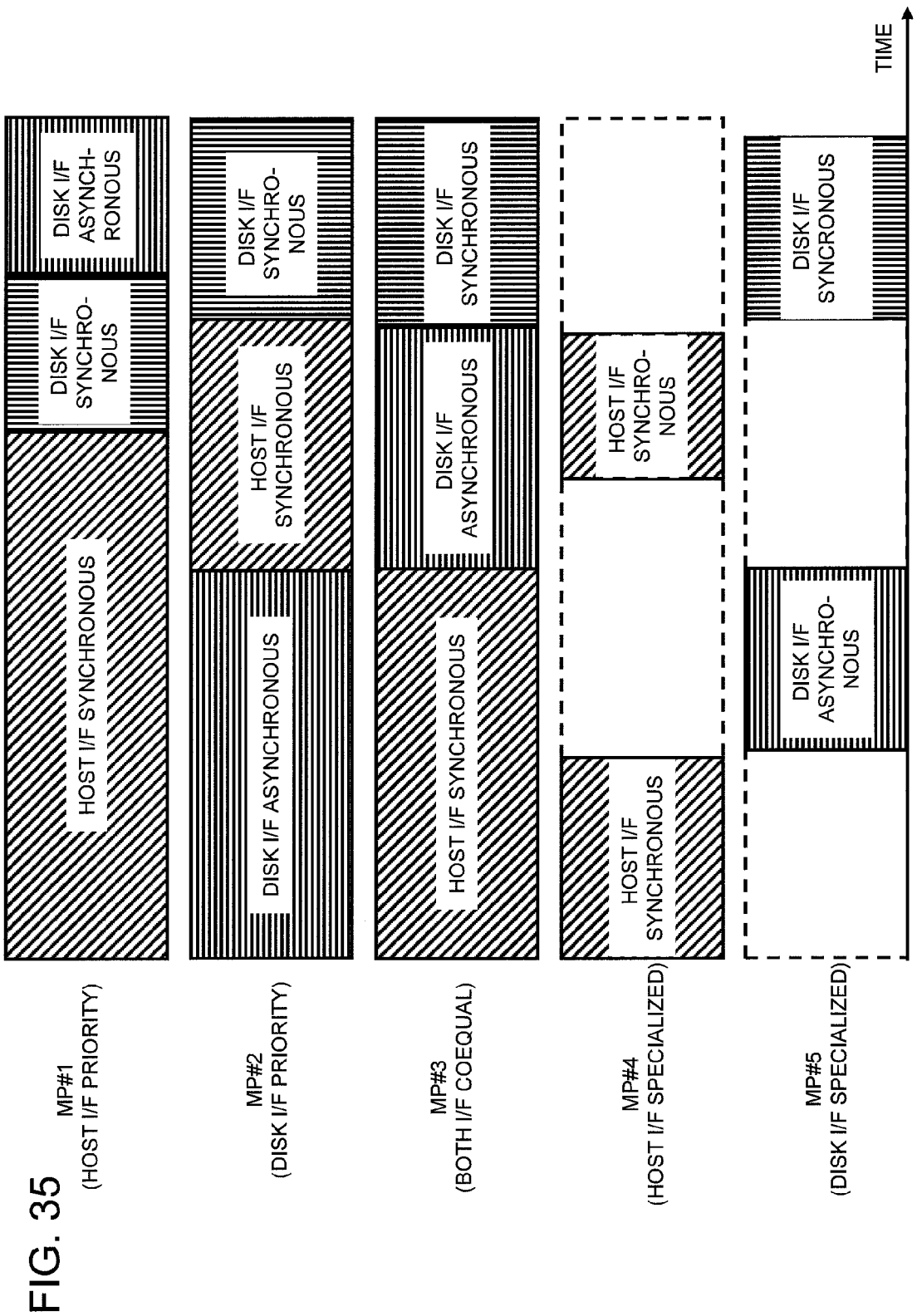
FIG. 35 is a diagram schematically showing the operating status of the microprocessor.

The first through the third stages from the top of FIG. 35 schematically show the operating status of the MP 121 in accordance with this embodiment. MP #1, which is being used in the "host I/F priority" mode, is shown in the first stage, MP #2, which is being used in the "disk I/F priority" mode, is shown in the second stage, and MP #3, which is being used in the "coequal" mode, is shown in the third stage.

The MP #1, which is in the host I/F priority mode, places priority on and executes more host I/F processing (the host data CM read process and the host data CM write process), and executes fewer disk I/F processing (the host data HDD read process and host data HDD write process). Alternatively, MP #2, which is in the disk I/F priority mode, places priority on and executes more disk I/F processing and executes fewer host I/F processing. The MP #3, which is in the coequal mode, executes host I/F processing and disk I/F processing on a coequal basis. The MPs #1 through #3 of the respective modes execute either synchronous processing or asynchronous processing with no breaks in between.

Embodiment 2

A second embodiment will be explained by referring to FIG. 28. This embodiment and those that follow are equivalent to variations of the first embodiment. Accordingly, the explanations of this and the following embodiments will focus on the differences with the first embodiment.

FIG. 28 shows an execution count limit tuning table 230A and an execution count table 240A. In this embodiment, a synchronous processing priority mode, an asynchronous processing priority mode and a coequal mode are used instead of the host I/F priority mode, the disk I/F priority mode, and the both I/Fs coequal mode of the first embodiment.

As for the relationship with the first embodiment, synchronous processing, for example, includes the host data CM read process, the host data CM write process and the host data HDD read process. Asynchronous processing, for example, includes the host data HDD write process.

The synchronous processing priority mode is for executing synchronous processing on a priority basis. In the synchronous processing priority mode, the upper limit value ULNes1 for executing synchronous processing is set higher than the upper limit value ULNeas1 for executing asynchronous processing (ULNes1>ULNeas1).

The asynchronous processing priority mode is for executing asynchronous processing on a priority basis. In the asynchronous processing priority mode, the upper limit value ULNes2 for executing synchronous processing is set lower than the upper limit value ULNeas2 for executing asynchronous processing (ULNes2<ULNeas2).

The coequal mode is for executing synchronous processing and asynchronous processing equally. In the coequal mode, the upper limit value ULNes3 for executing synchronous processing and the upper limit value ULNeas3 for executing asynchronous processing are set to an equal value (ULNes3=ULNeas3).

It is also possible for the MP 121 to be used efficiently from the standpoints of synchronous processing and asynchronous processing like this instead of the standpoints of host I/F processing and disk I/F processing. In this embodiment, each MP 121 is able to execute synchronous processing and asynchronous processing up to their respective upper limit values, making it possible to use the MPs 121 efficiently.

Embodiment 3

A third embodiment will be explained by referring to FIGS. 29 through 35. In this embodiment, a mode that specializes in host I/F processing and a mode that specializes in disk I/F processing will be added in addition to the host I/F priority mode, the disk I/F priority mode, and the both I/Fs coequal mode.

Figure 29:
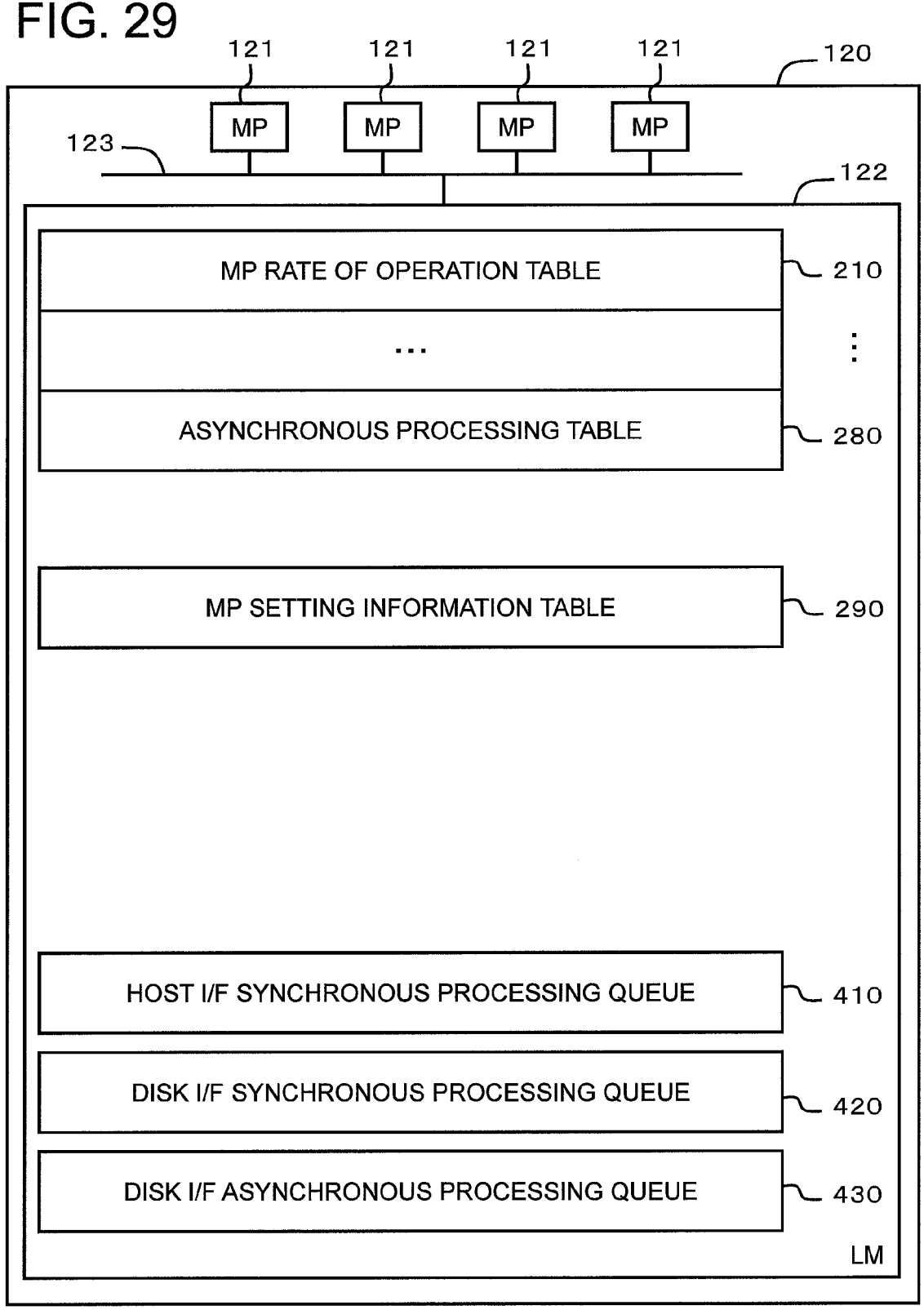
FIG. 29 is a block diagram of various types of information used by respective microprocessors of a storage system related to a third embodiment.

FIG. 29 shows the storage contents of the LM 122. In this embodiment, an MP setting information table 290 has been newly added to the configuration shown in FIG. 2.

FIG. 30 shows the configuration of the MP setting information table 290. This table 290 manages information that is set for each MP 121. The MP setting information table 290 comprises an MP number field 291 and an attribute flag field 292.

The MP number field 291 stores a number for identifying each MP 121. The attribute flag field 292 stores an attribute (mode) that is set for each MP 121. The modes include the host I/F priority mode, the disk I/F priority mode, the both I/Fs coequal mode, a host I/F specialized mode, and a disk I/F specialized mode.

The host I/F specialized mode specializes in host I/F processing. The disk I/F specialized mode specializes in disk I/F processing.

Figure 31:
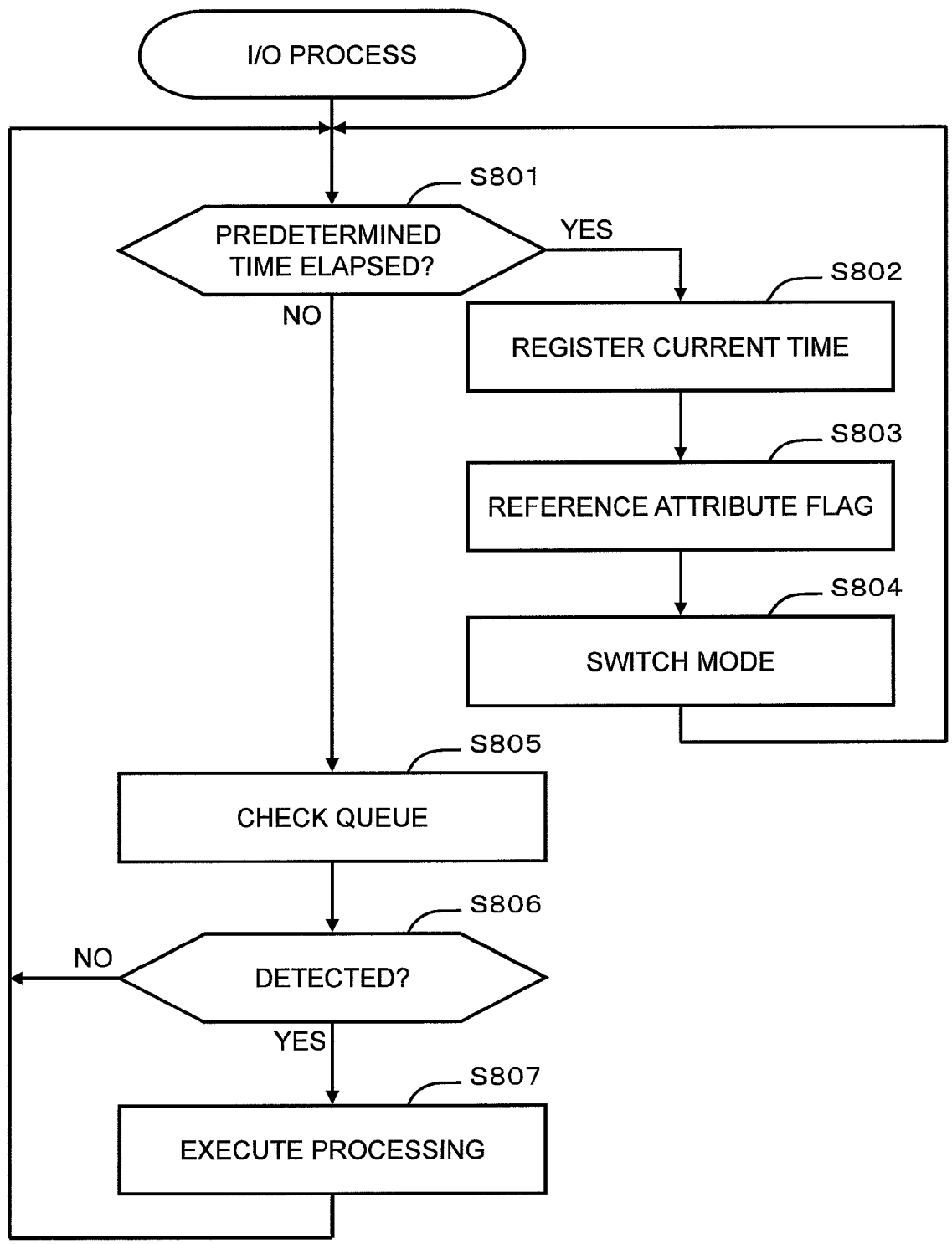
FIG. 31 is a flowchart of I/O processing.

FIG. 31 shows an I/O process. The MP 121 determines whether or not a predetermined time period has elapsed since the previous I/O process (S801). In a case where the predetermined time period has elapsed (S801: YES), the MP 121 registers the current time (S802), and next references the attribute flag stored in the table 290 (S803).

The MP 121 determines whether or not to switch the mode based on a variety of information, and in a case where it is determined to be necessary, switches the mode (S804). One example of a process that switches the mode will be described using FIG. 34. In a case where the mode is switched, the MP 121 checks for an unprocessed request, and when an unprocessed request exists, executes this process and ends the processing.

In a case where the predetermined time period has not elapsed (S801: NO), the MP 121 checks each of the queues 410 through 430 (S805), and in a case where a processing request is found (S806: YES), executes this processing request (S807).

Furthermore, the MP 121 checks either all or a portion of each of the queues 410 through 430 in accordance with the mode to which it itself has been set. In relation to the first embodiment, an MP that is set to the host I/F specialized mode only needs to check the host I/F synchronous processing queue 410; there is no need to check the disk I/F synchronous processing queue 420 or the disk I/F asynchronous processing queue 430. Similarly, an MP set to the disk I/F specialized mode only needs to check the disk I/F synchronous processing queue 420 or the disk I/F asynchronous processing queue 430; there is no need to check the host I/F synchronous processing queue 410.

Figure 32:
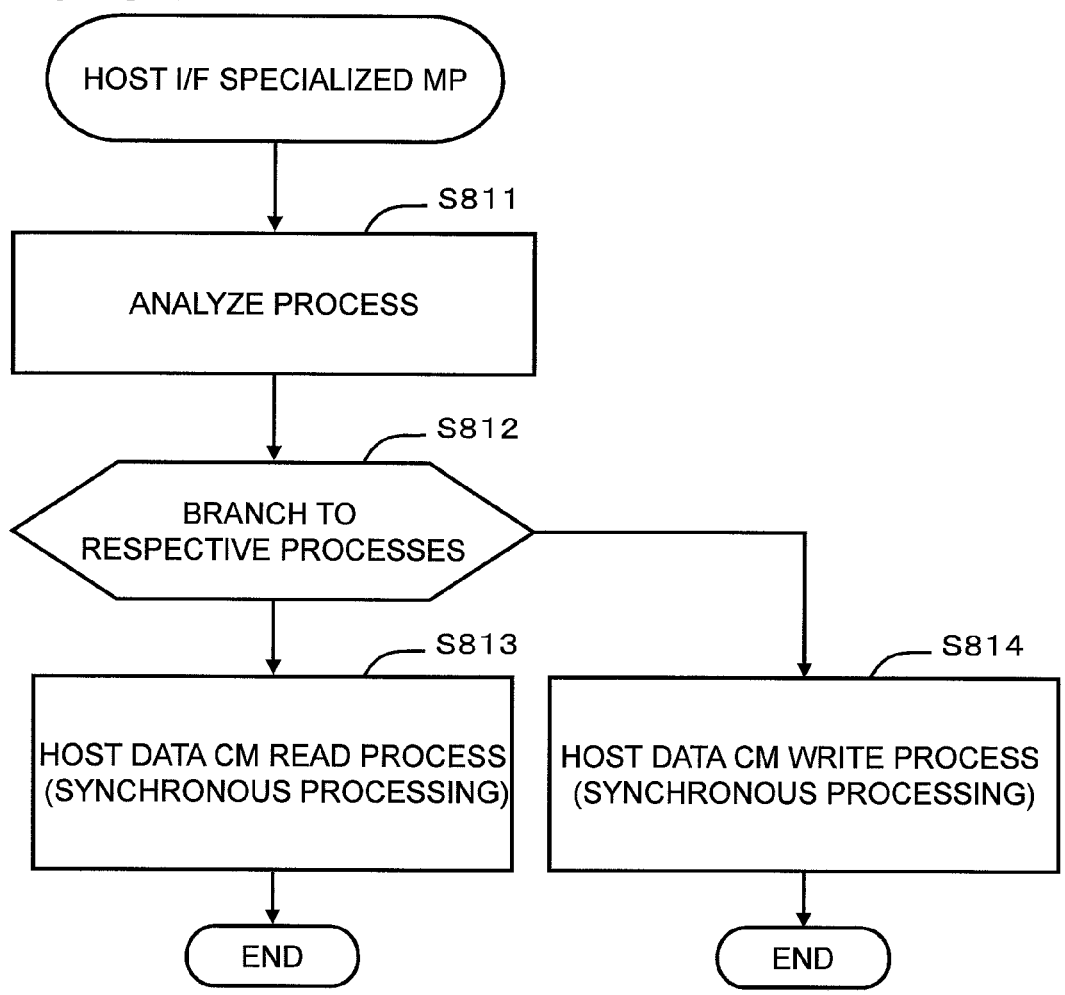
FIG. 32 is a flowchart showing the processing by the microprocessor in charge of the host interface.

FIG. 32 shows the processing of an MP set in the host I/F specialized mode. The MP 121, which specializes in processing related to the host I/F, analyzes a processing request fetched from the queue (S811), and branches to the respective processes in accordance with the results of the analysis (S812). The MP 121 executes either the host data CM read process (S813) or the host data CM write process (S814).

Figure 33:
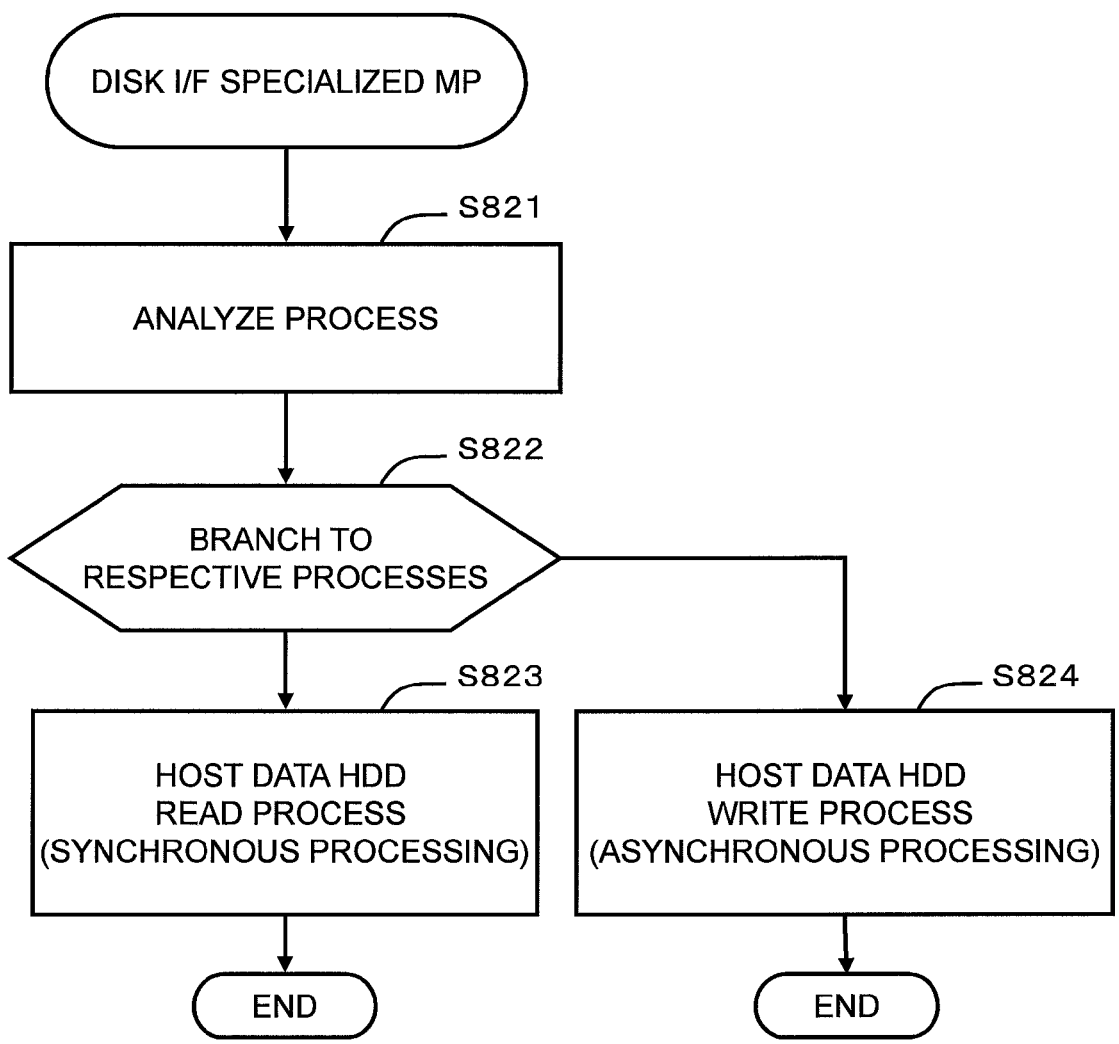
FIG. 33 is a flowchart showing the processing by the microprocessor in charge of the disk interface.

FIG. 33 shows the processing of an MP set to the disk I/F specialized mode. The MP 121, which specializes in processing related to the disk I/F, analyzes a processing request fetched from the queue (S821), and branches to the respective processes in accordance with the result of the analysis (S822). The MP 121 executes either the host data HDD read process (S823) or host data HDD write process (S824).

Figure 34:
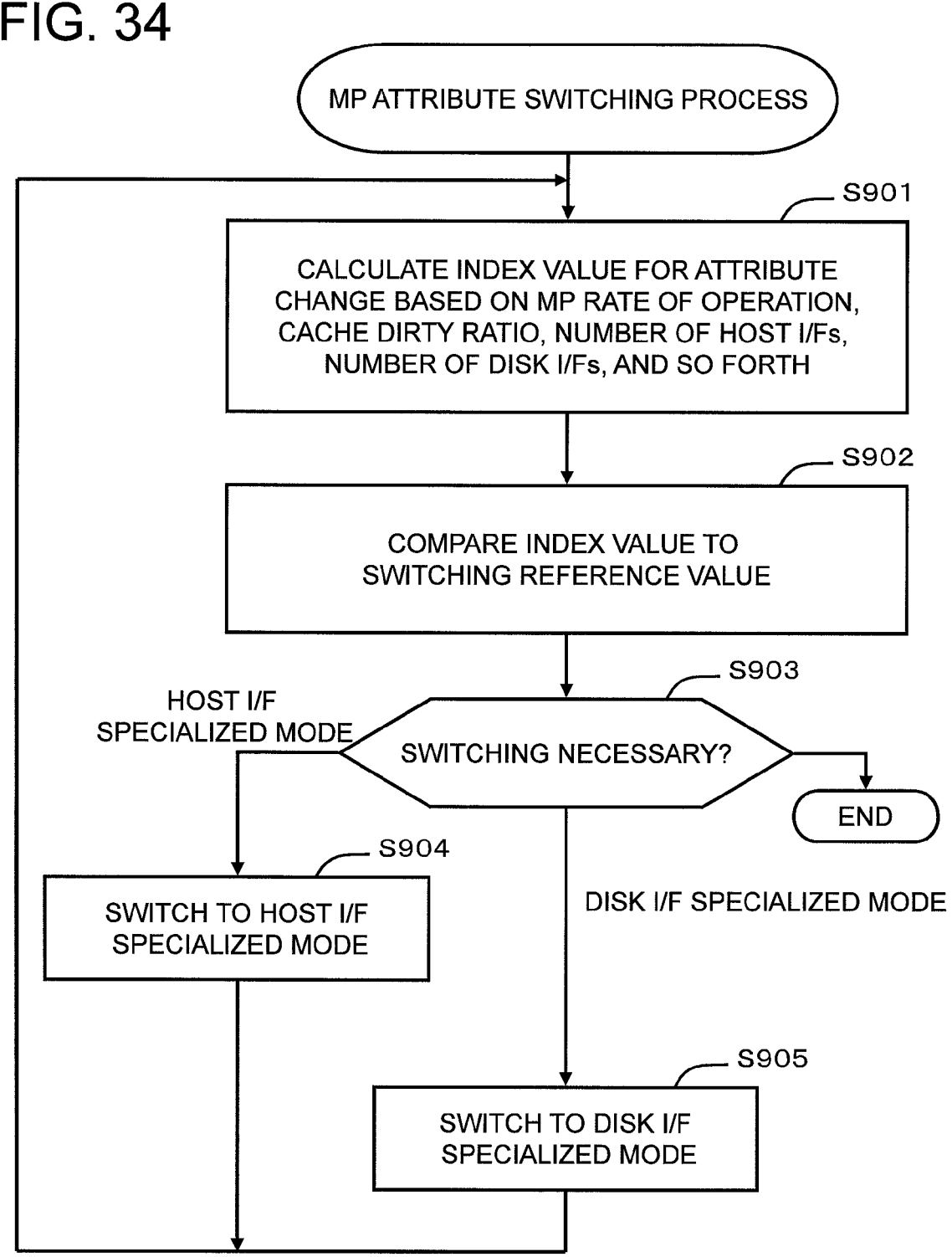
FIG. 34 is a flowchart showing the processing for switching the attribute of the microprocessor.

FIG. 34 shows processing for switching the MP attribute (mode). The MP 121, for example, calculates an index value for an attribute change based on the MP rate of operation, the cache dirty ratio, the number of synchronous processing requests accumulated in a queue, the number of asynchronous processing requests accumulated in a queue, the number of host I/Fs, the number of disk I/Fs, the number of MPs 121, the number of MPs set to either the host I/F priority mode or the host I/F specialized mode, and the number of MPs set either to the disk I/F priority mode or the disk I/F specialized mode (S901).

The MP 121 compares the calculated index value to a preset reference value for switching, and determines whether to switch to the host I/F specialized mode or to switch to the disk I/F specialized mode (S903).

In a case where it has been determined to switch to the host I/F specialized mode, the MP 121 switches to the host I/F specialized mode (S904). Alternatively, in a case it has been determined to switch to the disk I/F specialized mode, the MP 121 switches to the disk I/F specialized mode (S905).

FIG. 35 schematically shows the operating status of an MP used in each mode. MPs #1 through #3 were described in the first embodiment, and as such explanations of these MPs will be omitted here. A fourth stage MP #4 is set to the host I/F specialized mode. A fifth stage MP #5 is set to the disk I/F specialized mode.

The host I/F specialized mode MP #4 only executes processing related to the host I/F 111, and the disk I/F specialized mode MP #5 only executes processing related to the disk I/F 141. Therefore, in a case where there is no processing request in the host I/F synchronous processing queue 410, the MP #4 transitions to the idle state. Similarly, in a case where there is no processing request in either the disk I/F synchronous processing queue 420 or the disk I/F asynchronous processing queue 430, the MP #5 transitions to the idle state.

Therefore, in this embodiment, the utilization efficiency of the MP that is set either to the host I/F specialized mode or the disk I/F specialized mode is lower than that in the first embodiment. However, to provide an MP that specializes in either host I/F-related processing or disk I/F-related processing, this embodiment makes it possible to carry out processing without response deterioration even in a case where there is a sudden increase in I/O requests from the host computer.

Embodiment 4

A fourth embodiment will be explained by referring to FIGS. 36 through 40. This embodiment provides an MP that specializes in synchronous processing and an MP that specializes in asynchronous processing. The focus of the following explanation will be the provision of the synchronous processing specialized MP and the asynchronous processing specialized MP.

Figure 36:
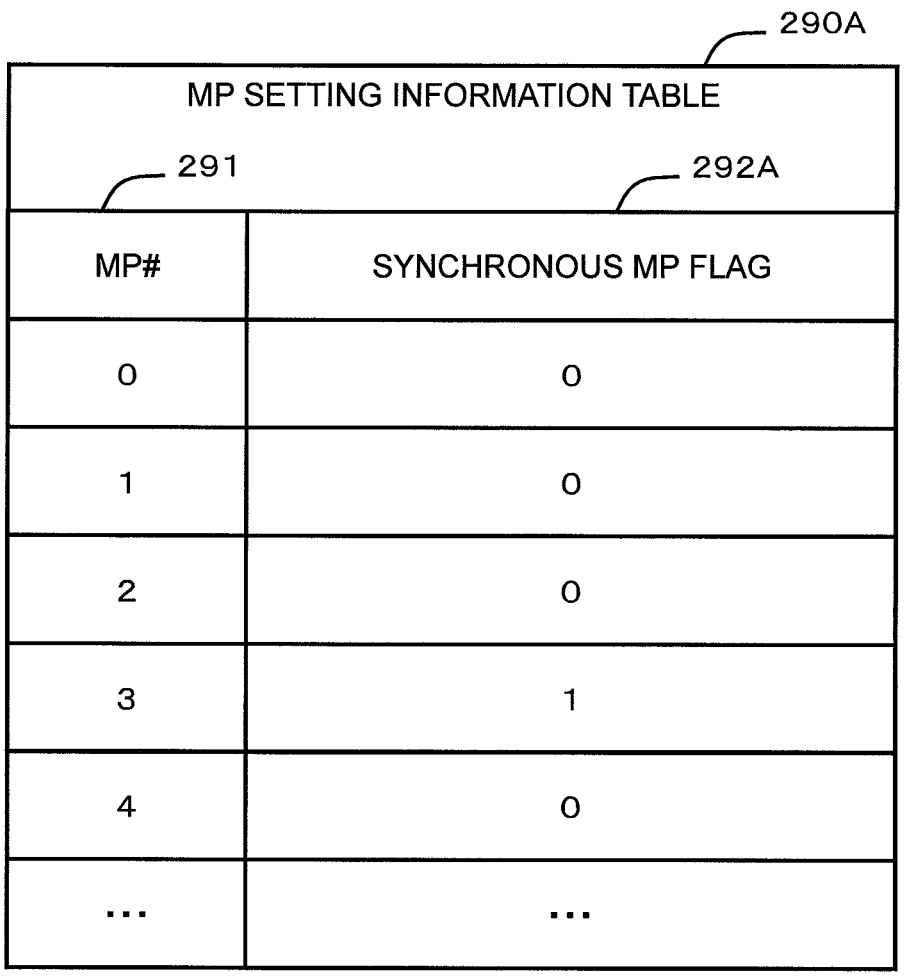
FIG. 36 is a table for managing information to be set in the microprocessor, which is used by a storage system related to a fourth embodiment.

FIG. 36 shows an MP setting information table 290A. The MP setting information table 290A comprises an MP number field 291 and a synchronous MP flag field 292A. The synchronous MP flag is information denoting whether or not an MP is a synchronous processing specialized MP. In a case where 1 has been set in the synchronous MP flag (synchronous MP flag=1), this MP is an MP that specializes in synchronous processing. In a case where 0 has been set in the synchronous MP flag (synchronous MP flag=0), this MP is an MP that specializes in asynchronous processing.

Figure 37:
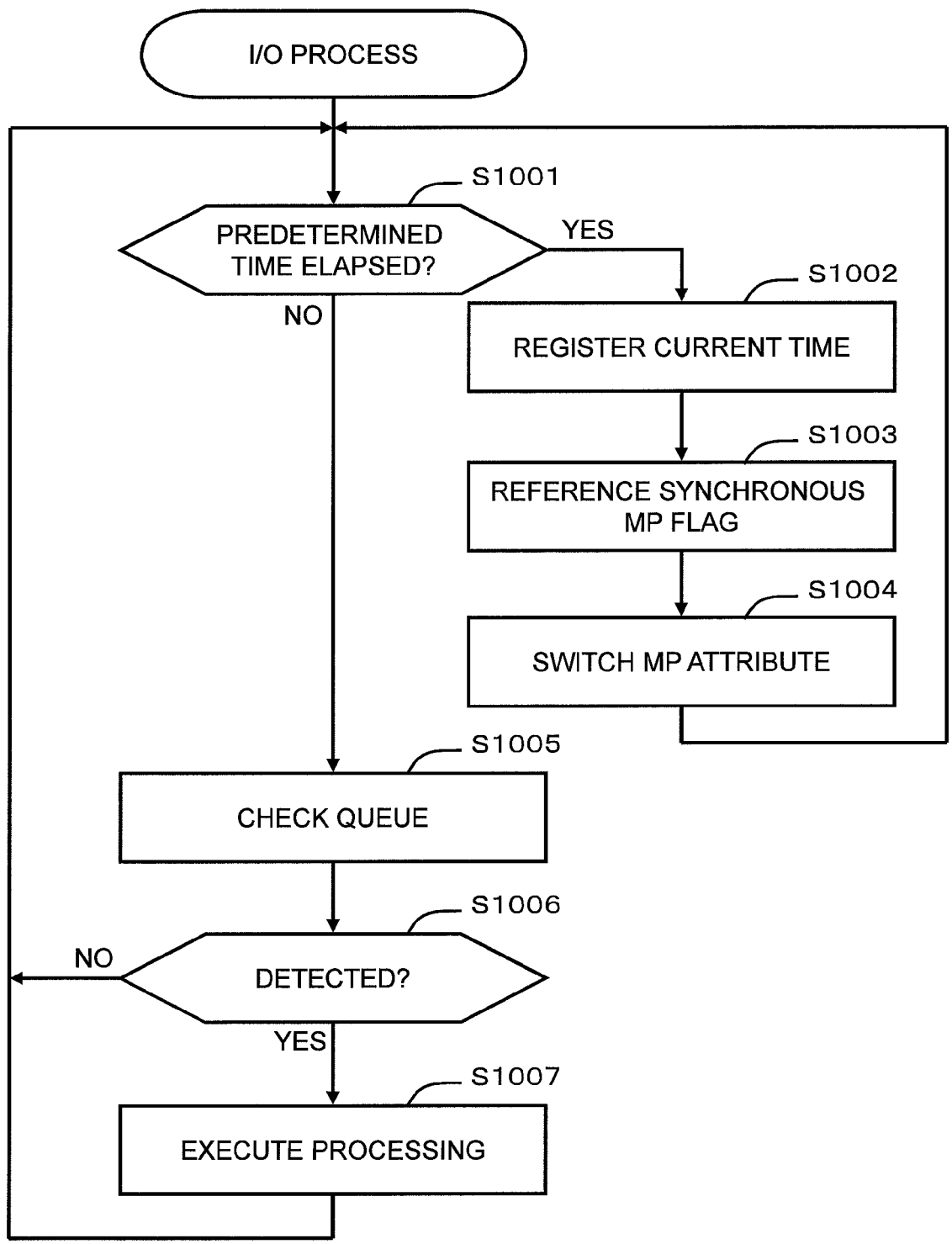
FIG. 37 is a flowchart of I/O processing.

FIG. 37 shows an I/O process. The MP 121 determines whether or not a predetermined time period has elapsed since the previous I/O process (S1001). In a case where the predetermined time period has elapsed (S1001: YES), the MP 121 registers the current time (S1002) and references the flag stored in the table 290A (S1003).

The MP 121 determines whether or not to switch the MP attribute based on a variety of information, and when it is determined to be necessary, switches the MP attribute (S1004). One example of a process that switches the MP attribute will described using FIG. 40. In a case where the MP attribute is switched, the MP 121 checks for an unprocessed request, and when an unprocessed request exists, executes this process and ends the processing.

In a case where the predetermined time period has not elapsed (S1001: NO), the MP 121 checks each of the queues 410 through 430 (S1005), and in a case where a processing request is found (S1006: YES), executes this processing request (S1007).

Furthermore, in relation to the first embodiment, a synchronous processing specialized MP only needs to check the host I/F synchronous processing queue 410 and disk I/F synchronous processing queue 420. An asynchronous processing specialized MP only needs to check the disk I/F asynchronous processing queue 430.

Figure 38:
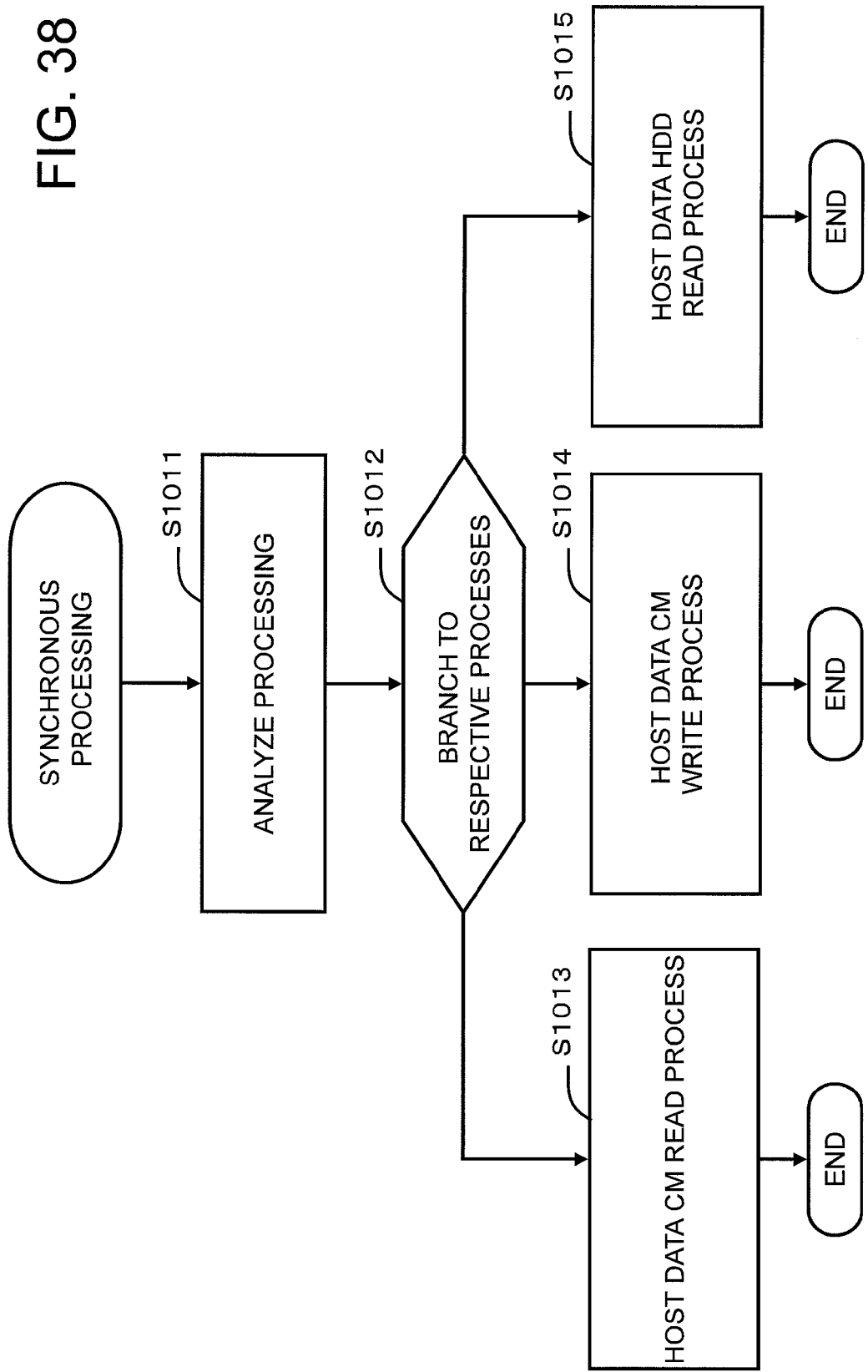
FIG. 38 is a flowchart of synchronous processing.

FIG. 38 shows the processing of an MP that is set to specialize in synchronous processing. The MP 121, which specializes in synchronous processing, analyzes a processing request fetched from the queue (S1011), and branches to the respective processes in accordance with the result of the analysis (S1012). The MP 121 executes either a host data CM read process (S1013), a host data CM write process (S1014), or a host data HDD read process (S1015). Furthermore, the configuration may be such that another synchronous process is also able to be executed.

Figure 39:
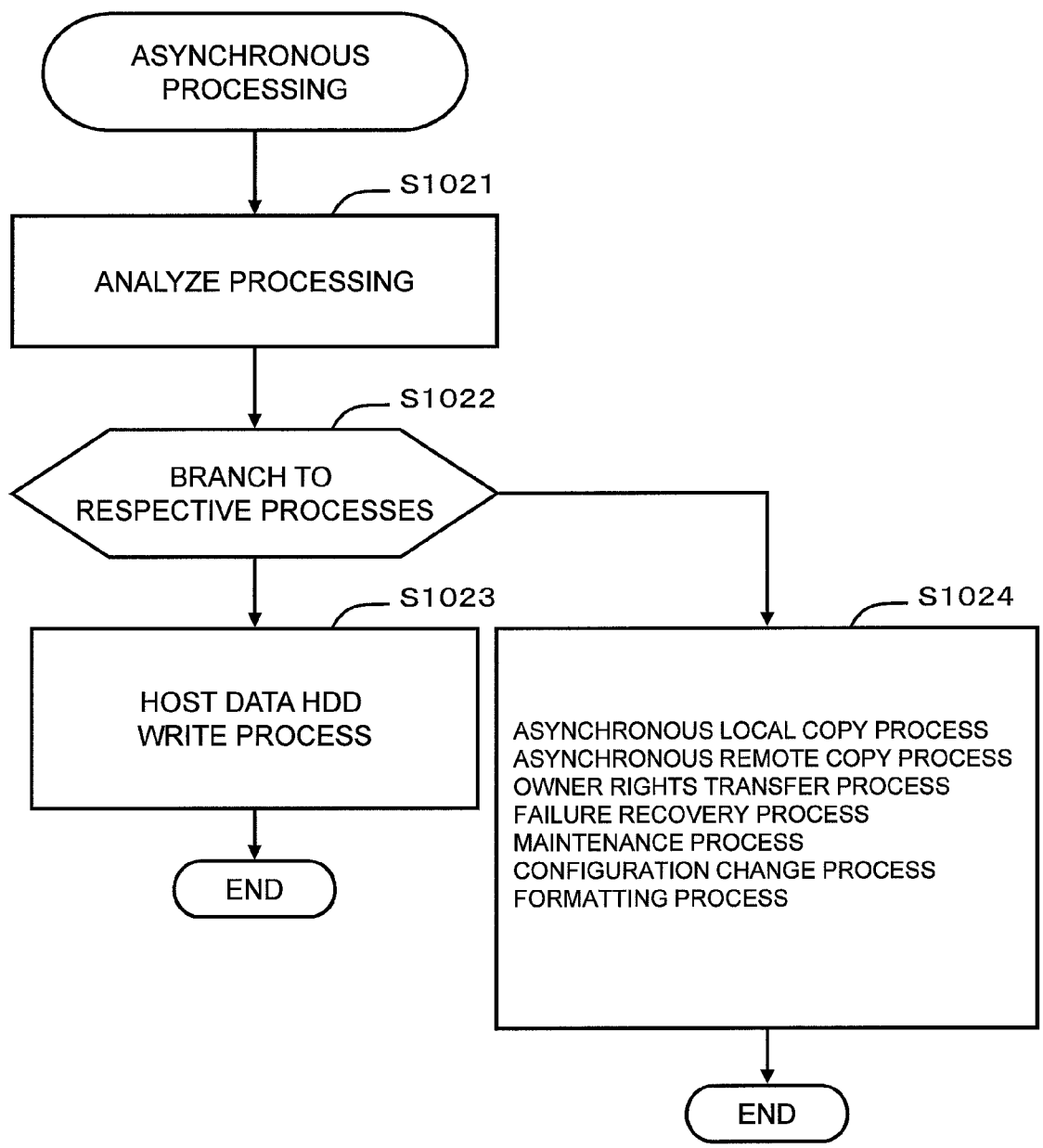
FIG. 39 is a flowchart of asynchronous processing.

FIG. 39 shows the processing of an MP that is set to specialize in asynchronous processing. The MP 121, which specializes in asynchronous processing, analyzes a processing request fetched from the queue (S1021), and branches to the respective processes in accordance with the result of the analysis (S1022). The MP 121 executes either a host data HDD read process (S1023) or another asynchronous process (S1024).

Other asynchronous processes, for example, may include an asynchronous local copy process, an asynchronous remote copy process, a copy function initial copy process, an owner rights transfer process, a failure recovery process, a configuration change process, a logical volume setting process, a storage system configuration change process, and a formatting process.

Figure 40:
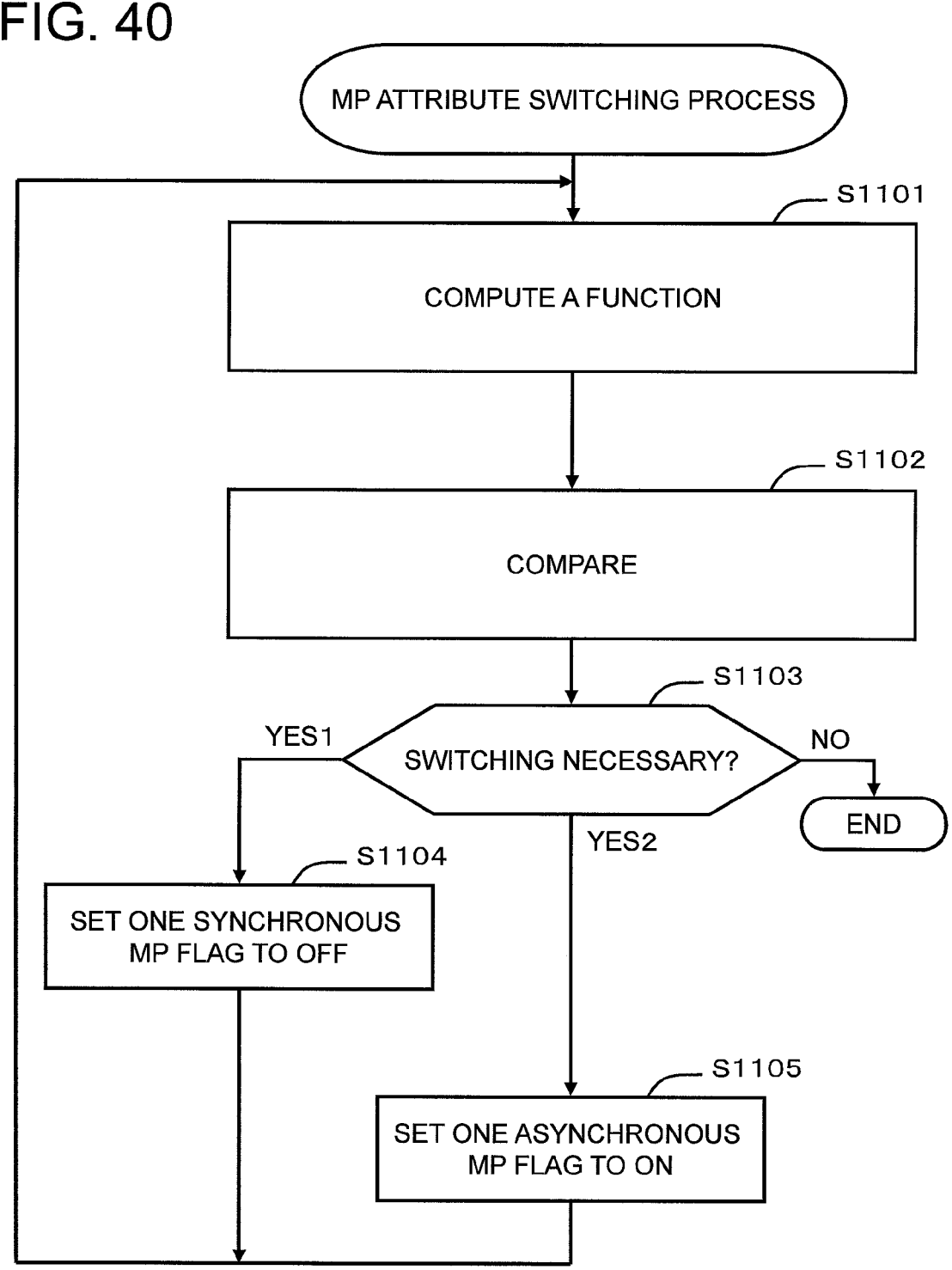
FIG. 40 is a flowchart showing the processing for switching the attribute of the microprocessor.

FIG. 40 shows the process for switching the MP attribute. The MP 121, for example, computes a function based on the MP rate of operation, the cache dirty ratio, the number of synchronous processing requests accumulated in a queue, the number of asynchronous processing requests accumulated in a queue, the number of host I/Fs, the number of disk I/Fs, the number of MPs 121, the number of MPs set to either the host I/F priority mode or the host I/F specialized mode, and the number of MPs set to either the disk I/F priority mode or the disk I/F specialized mode (S1101).

For example, the MP 121 computes a function Nsmp for determining the number of MPs specializing in synchronous processing and a function Nasmp for determining the number of MPs specializing in asynchronous processing (S1101). The Nsmp is calculated using Equation (1). The Nasmp is calculated using Equation (2). Hereinbelow, the MP specializing in synchronous processing may be called the synchronous MP and the MP specializing in asynchronous processing may be called the asynchronous MP.

[Math. 1]

$$N_{smp} = \text{floor}\left(\frac{nl/L}{l/L + (m + a + 2b + 3c + p - q)/M}\right) \quad (1)$$

-continued

[Math. 2]

$$N_{asmp} = ceil\left(\frac{n(m+a+2b+3c+p-q)/M}{l/L+(m+a+2b+3c+p-q)/M}\right) \quad (2)$$

The values of the respective types of variables in both Equation (1) and Equation (2) are as follows.
l: Number of host I/Fs (ports)
L: Maximum number of host I/Fs (ports) possible
m: Number of HDDs 170
M: Maximum number of HDDs 170 possible
n: Number of MPs 121
a: Number of RAID groups (or HDDs 170) corresponding to RAID level 1
b: Number of RAID groups (or HDDs 170) corresponding to RAID level 5
c: Number of RAID groups (or HDDs 170) corresponding to RAID level 6
p: Number of HDDs 170 (or volume pairs and/or logical volumes) corresponding to an asynchronous local copy
q: Number of HDDs 170 (or volume pairs and/or logical volumes) corresponding to a cache-resident function
floor (x): Function denoting the largest integer equal to or smaller than x
ceil (x): Function denoting the smallest integer equal to or larger than x In a case where the value of one of the Nsmp and the Nasmp is zero, 1 can be added to the one and 1 can be subtracted from the other. Furthermore, the cache resident function is for constantly holding at least a portion of the data inside the logical volume in the CM 131, and for improving the response to an I/O request.

The above-cited Equation (1) and Equation (2) are based on the idea that an increase in the number of host I/Fs 111 will require more synchronous processing, and an increase in the number of HDDs 170 will require more asynchronous processing. Specifically, the above-cited Equation (1) and Equation (2) are respectively based on Equation (3) and Equation (4) below.

[Math. 3]

$$N_{smp} = floor\left(\frac{nl/L}{l/L+k/M}\right) \quad (3)$$

[math. 4]

$$N_{asmp} = ceil\left(\frac{nk/M}{l/L+k/M}\right) \quad (4)$$

As used here, k is a computational expression that includes m, and increases when the value of m increases. According to Equations (1) through (4), a, b, c, p and q are included in k as elements. In this embodiment, m is an essential element, and the elements other than m do not necessarily have to be included in k. Including at least one of a, b, and c in k means that p and q do not need to be included, and including at least one of p and q in k means that none of a, b and c need to be included.

The above-cited Equations (1) through (4) are based on the idea that increasing the number of times that the HDD 170 is accessed will result in the need for more asynchronous processing.

Specifically, the fact that the coefficients of a, b and c become 1, 2 and 3 (these coefficients are examples) is due to the belief that, from among RAID 1, RAID 5 and RAID 6, the HDD 170 access count for RAID 1 will be the smallest, the access count for RAID 5 will be the next smallest after RAID 1 from the standpoint of one parity being created per stripe, and the access count for RAID 6 will be the largest from the standpoint of two parities being created per stripe.

Further, the fact that k increases when p increases (for example, the fact that p is added) is because when an asynchronous local copy is carried out the HDD 170 is accessed irrespective of I/O request-compliant access.

Further, the fact that k decreases when q increases (for example, the fact that q is subtracted) is because access to the CM 131 is enough, and the HDD 170 that constitutes the basis of the logical volume is not accessed even when an I/O request comprising the LUN of the logical volume corresponding to the cache-resident function is received.

The MP 121 compares the calculated Nsmp to the current number of synchronous MPs, and, in addition, compares the calculated Nasmp to the current number of asynchronous MPs (S1102), and determines whether or not it is necessary to change the number of synchronous MPs and the number of asynchronous MPs (S1103). The current number of synchronous MPs is the total number of entries in which the value of the synchronous MP flag is "1", and the current number of asynchronous MPs is the total number of entries in which the value of the synchronous MP flag is "0".

In a case where the results of S1102 are that the current number of synchronous MPs is equivalent to Nsmp, and, in addition, the current number of asynchronous MPs is equivalent to Nasmp (S1103: NO), this processing ends.

In a case where the result of S1102 is that the current number of asynchronous MPs is less that Nasmp (S1103: YES), the MP 121 selects one arbitrary synchronous MP and changes the value of the synchronous MP flag corresponding to this synchronous MP from "1" to "0" (S1104).

In a case where the result of S1102 is that the current number of synchronous MPs is less that Nsmp (S1103: YES), the MP 121 selects one arbitrary asynchronous MP and changes the value of the synchronous MP flag corresponding to this asynchronous MP from "0" to "1" (S1105).

In S1104 and/or S1105, either a synchronous MP or an asynchronous MP may be selected at random. Further, the selected either synchronous MP or asynchronous MP may be a MP that has a low rate of operation, which is processing execution time within a predetermined time (for example, the MP that has the lowest rate of operation among the synchronous MP group or the asynchronous MP group).

By configuring this embodiment like this, for example, a MP that specializes in synchronous processing and a MP that specializes in asynchronous processing are added to the configuration of the first embodiment, thereby making it possible to deal with a either a case in which synchronous processing is the focus, or a case in which a large volume of asynchronous processing must be executed.

Embodiment 5

A fifth embodiment will be explained by referring to FIG. 41. In this embodiment, an example of a configuration for executing a remote copy process will be explained.

Figure 41:
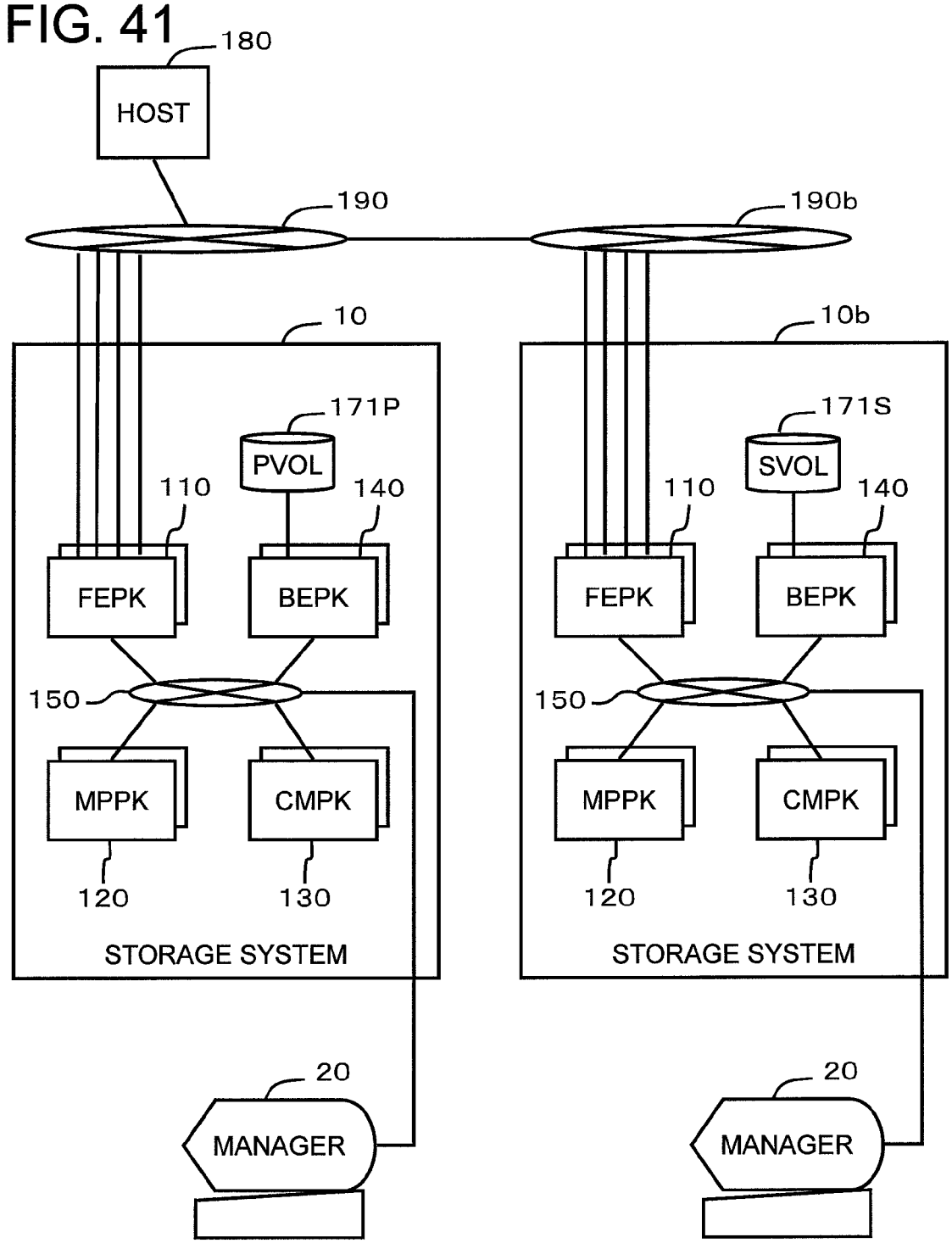
FIG. 41 is an overall diagram of a computer system comprising a storage system related to a fifth embodiment.

FIG. 41 is a drawing of an entire computer system. The computer system comprises a local site and a remote site. The local site comprises a host computer 180, a communication network 190, and a storage system 10. The remote site comprises another communication network 190b and another storage system 10b.

The storage system 10 of the local site comprises a copy-source logical volume (hereinafter the copy-source volume) 171P. The other storage system 10b of the remote site comprises a copy-destination logical volume (hereinafter, the copy-destination volume) 171S. The copy-source volume 171P and the copy-destination volume 171S form a remote copy pair.

In the configuration shown in FIG. 41, in the case of asynchronous remote copy, data is transferred to the copy-destination volume 171S in synch with a data write to the copy-source volume 171P by the host computer 180.

In the case of an asynchronous remote copy, the host computer 180 writes the data to the copy-source volume 171P, after which this data is transferred to the copy-destination volume 171S at a separate timing.

Embodiment 6

A sixth embodiment will be explained by referring to FIG. 42. In this embodiment, a case in which multiple MPs 121 share the execution of a series of processes will be explained.

Figure 42:
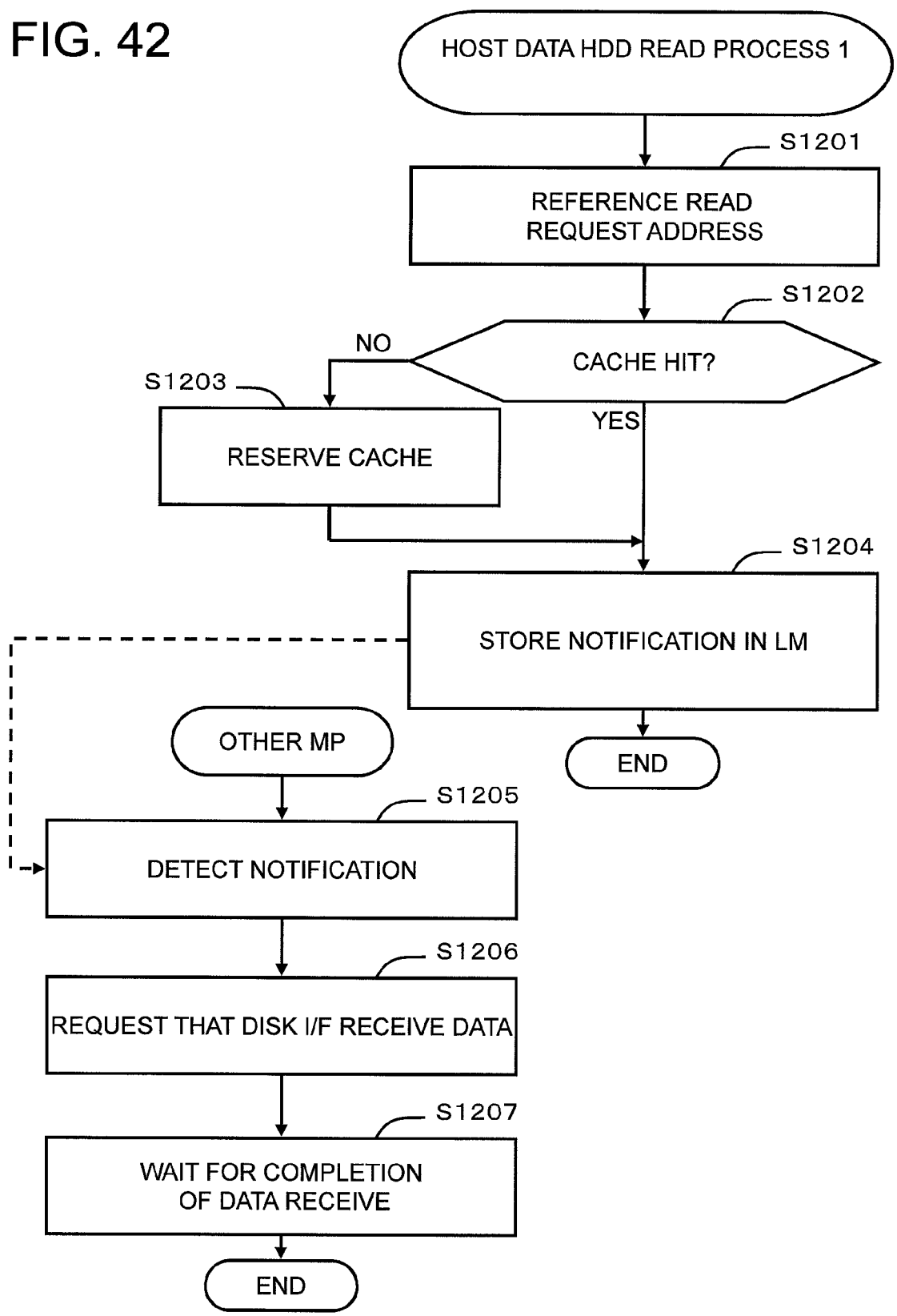
FIG. 42 is a flowchart showing the processing for reading from the storage device host data that is operated on by a storage system related to a sixth embodiment.

FIG. 42 shows processing for reading data requested by the host computer 180 from the HDD 170 and transferring this data to the CM 131. The processing of FIG. 42 shows a case in which the processing of FIG. 22 is shared by multiple MPs 121.

A first MP 121 references a read request (S1201), and determines whether or not a cache area corresponding to the read request has been reserved in the CM 131 (S1202). In a case where the cache area has not been reserved (S1202: NO), the first MP 121 reserves the cache area in the CM 131 (S1203). The first MP 121 stores a notification in the LM 122 to the effect that the read-requested processing will continue (S1204).

A second MP 121, upon checking the LM 122 and detecting this notification (S1205), requests that the disk I/F 141 receive data from the HDD 170 (S1206). The second MP 121 stores the processing request in the disk I/F synchronous processing queue 420. The second MP 121 waits until the disk I/F 141 reads the data from the HDD 170 and transfers this data to the cache area reserved in the CM 131 (S1207).

The configuration can be such that the execution of the host data HDD write process shown in FIG. 24 is also shared by multiple MPs 121. The configuration may be such that the first MP 121 executes S601 of FIG. 24, stores a notification in the LM 122 to the effect that the execution of S601 has been completed, and the second MP 121 detects this notification and executes S602 and S603.

Furthermore, the present invention is not limited to the embodiments described hereinabove. A person with ordinary skill in the art will be able to make various additions and changes without departing from the scope of the present invention.

REFERENCE SIGNS LIST

10 Storage system
20 Management console
100 Controller
110 Front-end package (FEPK)
111 Host interface
120 Microprocessor package (MPPK)
121 Microprocessor (MP)
122 Local memory
130 Cache memory package (CMPK)
131 Cache memory (CM)
140 Back-end package (BEPK)
141 Disk interface
170 Storage device (HDD)
171 Logical volume
180 Host computer

The invention claimed is:

1. A storage system comprising:
   a plurality of storage devices that are configured to provide a plurality of logical volumes; and
   a controller, which receives from an external device an input/output request that specifies any of the plurality of logical volumes and processes the input/output request,
   wherein the controller comprises a first interface for communicating with the external device, a second interface for communicating with the storage devices, and a memory, the memory being respectively coupled to the first interface and the second interface, and a plurality of microprocessors, each of the plurality of microprocessors being respectively coupled to the first interface, the second interface, and the memory,
   wherein each of the plurality of microprocessors is configured to execute synchronous processing and asynchronous processing,
   wherein execution of the synchronous processing is triggered by the input/output request from the external device, and the asynchronous processing is processing other than the synchronous processing,
   wherein each of the plurality of microprocessors is configured to execute the synchronous processing up to a preset upper limit value, and is configured to execute the asynchronous processing when the synchronous processing is not executed,
   wherein upper limit value management information for correspondingly managing a first upper limit value and a second upper limit value for each of a plurality of prescribed modes is stored in a memory area that is used by the respective microprocessors,
   wherein the first upper limit value refers to an upper limit value of the number of times that synchronous processing with respect to the first interface may be executed from among the synchronous processing,
   wherein the second upper limit value refers to an upper limit value of the number of times that synchronous processing and asynchronous processing with respect to the second interface may be executed from among the synchronous processing and the asynchronous processing,
   wherein in a first mode, which is included in the plurality of modes, the first upper limit value is set higher than the second upper limit value,
   wherein in a second mode, which is included in the plurality of modes, the second upper limit value is set higher than the first upper limit value,
   wherein in a third mode, which is included in the plurality of modes, the first upper limit value and the second upper limit value are set equal to each other,
   wherein any one mode of the first mode, the second mode, or the third mode is set for each of the microprocessors,
   wherein which of the first mode, the second mode, or the third mode is to be set in each of the microprocessors is determined at a prescribed cycle based on a utilization rate of each of the microprocessors and an amount of unwritten data, which is stored only in the memory and has not been written to the storage device,
   wherein when the utilization rate is less than a prescribed utilization rate, the first mode is set,
   wherein when the utilization rate is equal to or larger than the prescribed utilization rate, and the amount of the unwritten data is equal to or larger than a prescribed data amount, the second mode is set, and wherein when the utilization rate is equal to or larger than the prescribed utilization rate, and the amount of the unwritten data is less than the prescribed data amount, the third mode is set.

2. A storage system comprising:

a plurality of storage devices that are configured to provide a plurality of logical volumes; and a controller, which receives from an external device an input/output request that specifies any of the plurality of logical volumes and processes the input/output request, wherein the controller comprises a first interface for communicating with the external device, a second interface for communicating with the storage devices, and a memory, the memory being respectively coupled to the first interface and the second interface, and a plurality of microprocessors, each of the plurality of microprocessors being respectively coupled to the first interface, the second interface, and the memory, wherein each of the plurality of microprocessors is configured to execute synchronous processing and asynchronous processing, wherein execution of the synchronous processing is triggered by the input/output request from the external device, and the asynchronous processing is processing other than the synchronous processing, wherein each of the plurality of microprocessors is configured to execute the synchronous processing up to a preset upper limit value, and is configured to execute the asynchronous processing when the synchronous processing is not executed, and wherein the upper limit value is set in accordance with one mode that is selected from among a plurality of modes.

3. The storage system according to claim 2, wherein any one mode of the plurality of modes is set in each of the plurality of microprocessors at a prescribed cycle, wherein the plurality of modes each comprise a synchronous processing priority mode, in which the number of times that the synchronous processing is configured to be executed is set higher than the number of times that the asynchronous processing is configured to be executed, and an asynchronous processing priority mode, in which the number of times that the synchronous processing is configured to be executed is set lower than the number of times that the asynchronous processing is configured to be executed, and wherein each of the plurality of microprocessors executes the synchronous processing and the asynchronous processing in accordance with any one mode that is set from among the plurality of modes.

4. The storage system according to claim 3, wherein any one mode of the plurality of modes is set in each of the plurality of microprocessors at the prescribed cycle based on a utilization rate of each of the microprocessors, and an amount of unwritten data, which is stored only in the memory and has not been written to the storage device.

5. The storage system according to claim 3, wherein the plurality of microprocessors further comprise a microprocessor that is set to a synchronous processing specialized mode, in which only the synchronous processing is executed, and a microprocessor that is set to an asynchronous processing specialized mode, in which only the asynchronous processing is executed.

6. A storage system comprising:

a plurality of storage devices that are configured to provide a plurality of logical volumes; and a controller, which receives from an external device an input/output request that specifies any of the plurality of logical volumes and processes the input/output request, wherein the controller comprises a first interface for communicating with the external device, a second interface for communicating with the storage devices, and a memory, the memory being respectively coupled to the first interface and the second interface, and a plurality of microprocessors, each of the plurality of microprocessors being respectively coupled to the first interface, the second interface, and the memory, wherein each of the plurality of microprocessors is configured to execute synchronous processing and asynchronous processing, wherein execution of the synchronous processing is triggered by the input/output request from the external device, and the asynchronous processing is processing other than the synchronous processing, wherein each of the plurality of microprocessors is configured to execute the synchronous processing up to a preset upper limit value, and is configured to execute the asynchronous processing when the synchronous processing is not executed, wherein upper limit value management information for correspondingly managing a first upper limit value and a second upper limit value for each of a plurality of prescribed modes is stored in a memory area that is used by the respective microprocessors, wherein the first upper limit value refers to an upper limit value of the number of times that synchronous processing with respect to the first interface may be executed from among the synchronous processing, wherein the second upper limit value refers to an upper limit value of the number of times that synchronous processing and asynchronous processing with respect to the second interface may be executed from among the synchronous processing and the asynchronous processing, wherein in a first mode, which is included in the plurality of modes, the first upper limit value is set higher than the second upper limit value, wherein in a second mode, which is included in the plurality of modes, the second upper limit value is set higher than the first upper limit value, wherein in a third mode, which is included in the plurality of modes, the first upper limit value and the second upper limit value are set equal to each other, and wherein any one mode of the first mode, the second mode, or the third mode is set for each of the microprocessors.

7. The storage system according to claim 6, wherein the plurality of modes further comprises a fourth mode, in which only the synchronous processing with respect to the first interface is executed, and a fifth mode, in which only the synchronous processing and the asynchronous processing with respect to the second interface are executed, and wherein any one mode of the first mode, the second mode, the third mode, the fourth mode, or the fifth mode is set at a prescribed cycle for each of the plurality of microprocessors.

8. The storage system according to claim 7, wherein, in the fifth mode, the execution of either the synchronous processing or the asynchronous processing with respect to the second interface is shared by the plurality of microprocessors of the respective microprocessors.

9. A storage system comprising:
a plurality of storage devices that are configured to provide a plurality of logical volumes; and
a controller, which receives from an external device an input/output request that specifies any of the plurality of logical volumes and processes the input/output request,
wherein the controller comprises a first interface for communicating with the external device, a second interface for communicating with the storage devices, and a memory, the memory being respectively coupled to the first interface and the second interface, and a plurality of microprocessors, each of the plurality of microprocessors being respectively coupled to the first interface, the second interface, and the memory,
wherein each of the plurality of microprocessors is configured to execute synchronous processing and asynchronous processing,
wherein execution of the synchronous processing is triggered by the input/output request from the external device, and the asynchronous processing is processing other than the synchronous processing,
wherein each of the plurality of microprocessors is configured to execute the synchronous processing up to a preset upper limit value, and is configured to execute the asynchronous processing when the synchronous processing is not executed, and
wherein the synchronous processing is required to be executed between the time when the input/output request is received by the controller and the time when a response to this input/output request is sent to the external device.

10. A method for sharing processing in a storage system, the storage system comprising a plurality of storage devices that are configured to provide a plurality of logical volumes, and a controller, which receives from an external device an input/output request that specifies any of the plurality of logical volumes and processes the input/output request, the controller comprising a first interface for communicating with the external device, a second interface for communicating with the respective storage devices, and a plurality of microprocessors, the plurality of microprocessors being respectively coupled to the first interface and the second interface, the method comprising:
executing, by each of the plurality microprocessors, in accordance with one mode selected from among a plurality of modes, synchronous processing,
wherein execution of the synchronous processing is triggered by the input/output request from the external device; and
executing, by each of the microprocessors, in accordance with the one mode selected from among the plurality of modes, asynchronous processing, which is processing other than the synchronous processing,
wherein each of the plurality of modes comprises at least a synchronous processing priority mode, in which the number of times that the synchronous processing is configured to be executed is set higher than the number of times that the asynchronous processing is configured to be executed, and an asynchronous processing priority mode, in which the number of times that the synchronous processing is configured to be executed is set lower than the number of times that the asynchronous processing is configured to be executed.

11. The method according to claim 10, wherein the plurality of modes further comprise a synchronous processing specialized mode, in which only the synchronous processing is executed, and an asynchronous processing specialized mode, in which only the asynchronous processing is executed.

* * * * *